United States Patent [19]
Fulp et al.

[11] Patent Number: 6,055,571
[45] Date of Patent: Apr. 25, 2000

[54] COMPUTER NETWORK WITH MICROECONOMIC FLOW CONTROL

[75] Inventors: Errin W. Fulp, Raleigh, N.C.; Maximilian Ott, Pennington; Daniel Reininger, Princeton, both of N.J.

[73] Assignee: NEC USA, Inc., Princeton, N.J.

[21] Appl. No.: 08/971,127

[22] Filed: Nov. 20, 1997

[51] Int. Cl.⁷ .................................................. G06F 13/00
[52] U.S. Cl. ........................................................... 709/224
[58] Field of Search .................................... 709/200, 201, 709/203, 217, 218, 219, 224, 225, 226

[56] References Cited

U.S. PATENT DOCUMENTS

| 5,802,502 | 9/1998 | Gell et al. | 379/114 |
| 5,848,139 | 12/1998 | Grover | 379/114 |
| 5,982,771 | 11/1999 | Caldara et al. | 370/389 |

OTHER PUBLICATIONS

C. Cocchi et al, "Pricing in Computer Networks: Motivation, Formulation, and Example," IEEE/ACM Transactions on Networking, vol. 1, No. 6, Dec. 1993, pp. 614–627.
D. Ferguson et al., "An Economy for Flow Control in Computer Networks," 1989 IEEE, pp. 110–118.
J. MacKie–Mason et al, "Pricing Congestible Network Resources," IEEE Journal on Selected Areas in Communications, vol. 13, No. 7, Sep. 1995, pp. 1141–1149.
H. Jiang et al, "A Pricing Model for High Speed Networks with Guaranteed Quality of Service," INFOCOM '96, 1996 IEEE, pp. 888–895.
J. Murphy et al, "Bandwidth Allocation by Pricing in ATM Networks," ITC '95, Jun. 1995, pp. 1–17.
A. Krishnamurthy et al, "A pricing mechanism for scalable video delivery," Multimedia Systems (1996) 4:328–337.
D. Reininger et al, "Soft Quality of Service with VBR⁺ Video," AVSPN '97, Sep. 15, 1997.
H. Ji et al, "GoS–Based Pricing and Resource Allocation for Multimedia Broadband Networks," INFOCOM '96, 1996 IEEE, pp. 1020–1027.

*Primary Examiner*—Moustafa M. Meky
*Attorney, Agent, or Firm*—Sughrue, Mion, Zinn Macpeak & Seas, PLLC

[57] ABSTRACT

There is disclosed a decentralized flow control technique based on microeconomics. In this framework, there are three important entities: switches, network brokers and users. Switches independently price their resources to provide flow control and to encourage high utilization. A network broker, located at the entrance of the network, works as an agent for a user, monitoring the budget, prices and needs. Using this information the network broker may purchase resources to maximize the user's quality of service. This approach has several advantages such as: decentralized control, minimal signaling, Pareto-optimal resource distribution, price stability and high network utilization.

23 Claims, 21 Drawing Sheets

COMPUTER NETWORK WITH MICROECONOMIC FLOW CONTROL

BACKGROUND OF THE INVENTION

1. Field of the Invention

The invention relates to computer networks in general. In particular, the invention relates to a computer network with microeconomic flow control. The invention is embodied in a computer network operating according to a particular flow control method, in a node of a computer network which operates according to the method, in a computer program product for enabling a computer network or a node of a computer network to operate according to the method, and in a method per se of flow control for a computer network.

2. Related Efforts

Many network applications require certain Quality of Service (QoS) guarantees, such as bounds on cell loss or cell delay. These guarantees can be provided if resources, such as bandwidth and buffer space, are available. Networks attempt to provide these guarantees as efficiently as possible due to the limited number of resources. For this reason, flow control is needed so as properly to manage network resources.

Viewing the network as an economy can provide a new perspective to this problem. One can consider users as consumers and resources as commodities. In this scenario, users may be charged for the resources they use, and resources may be priced to reflect supply and demand. So as realistically to apply these ideas to a network, any pricing strategy should be scalable, and should allow the demands of users to change over time.

Microeconomics has been applied to networks in various manners. MacKie-Mason and Varian, proposed a pricing system based on congestion (see J. K. MacKie-Mason and H. R. Varian, "Pricing Congestible Network Resources," *IEEE Journal on Selected Areas in Communications*, 13(7):1141–1149, September 1995, which is incorporated by reference as useful background information). As congestion increases so does the price and vice versa. Pricing is done to internalize the externality of usage. Ferguson, et al. proposed a flow control mechanism based on a microeconomic model of a computer network (see D. F. Ferguson, C. Nikolaou, and Y. Yemini, "An Economy for Flow Control in Computer Networks," in *IEEE INFOCOM'89*, pages 110–118, 1989, which also is incorporated by reference as useful background information). Prices of links in the system were iteratively adjusted until a equilibrium of supply and demand was reached. They were able to prove that the system achieved a Nash equilibrium; yet they required demands to be constant until the equilibrium price was determined. If the demands changed, the prices were no longer valid. Similarly, Murphy and Murphy used microeconomics to price bandwidth for ATM virtual channels (see J. Murphy and L. Murphy, "Bandwidth Allocation by Pricing in ATM Networks," in *ITC*, June 1995, also incorporated by reference).

Other efforts and approaches focus on priority pricing. Cocchi, et al. investigated flat pricing and hierarchical pricing based on priority (R. Cocchi, S. Shenker, D. Estrin, and L. Zhang, "Pricing in Computer Networks: Motivation, Formulation, and Example," *IEEE/ACM Transactions on Networking*, 1(6):614–627, December 1993, incorporated by reference for background). Priority was introduced to provide a fairer distribution of resources to low and high priority traffic. Switches were responsible for maintaining logically separate queues of different priority traffic. Higher priority traffic receive better service but at a higher cost. They found that it is possible to set prices for users with various applications so they were more satisfied with the cost and performance of the network.

Recent approaches have included quality of service (QoS) measurements and/or scaling in pricing resources. Ji, et al. introduced a pricing method based on grade of service provided (see H. Ji, J. Y. Hui, and E. Karasan, "GoS-Based Pricing and Resource Allocation for Multimedia Broadband Networks," in *IEEE INFOCOM'96*, pages 1020–1027, 1996, incorporated by reference). Traffic is categorized based on service requirements and is priced within this group to maximize the total utility. Jiang and Jordan combined effective bandwidth and a pricing mechanism to maximum user benefit along virtual circuits, circuit bundles and virtual paths (see H. Jiang and S. Jordan, "A Pricing Model for High-Speed Networks with Guaranteed Quality of Service," in *IEEE INFOCOM'96*, pages 888–895, 1996, incorporated by reference).

Krishnamurthy, Little and Castanon introduced a pricing scheme that allowed the user to linearly scale their requirements as prices changed (see A. Krishnamurthy, T. D. C. Little, and D. Castanon, "A Pricing Mechanism for Scalable Video Delivery," *Multimedia Systems*, 4:328–337, 1996, incorporated by reference). Connections provide information about scalability and are encouraged, via pricing, to scale back their allocation when resources are scarce.

While many of these methods show promising results, they rely on centralized algorithms, hypothetical utility curves, or constant rate sources.

In particular, previous efforts generally provide for a Call Admission Controller (CAC) on every switch. For a user (also referred to as a client) to be allowed to send at a higher rate (i.e., to use more resources) every CAC on the route must be contacted and the request for permission to send at the higher rate given. Each CAC must render its approval prior to the higher rate transmission beginning. This is disadvantageous in that the first CAC needs to handle the request for all connections on the switch. The more switches, the more cooperation is required and the more overhead is used. Furthermore, the client needs to wait for the reply before changing its consumption rate (i.e., using more resources, sending at a higher rate). Because CAC intervention and approval is required for each CAC en route before the higher consumption is begun by the client, there is a latency inherent in the CAC approach.

Thus, three significant disadvantages of the CAC approach are high overhead, substantial cooperation, and high latency.

SUMMARY OF THE INVENTION

The control system according to the invention has a new decentralized market-based approach to flow control in computer networks. In the approach according to the invention, pricing encourages users to use resources when demand is low, and to reduce consumption when resources are scarce. Therefore, the central idea is to tie prices directly to supply and demand. Pricing is decentralized, allowing the technique to be applied to various networks. Prices are set so as also to provide a fair distribution based on budgets. Users react to prices through a broker and can scale their consumption based on their QoS profile. The QoS profile serves as a utility curve and is derived from empirical measurements.

The invention is advantageous in that it achieves all of the following: internalization of the externality of consumption;

achievement of an equilibrium price at a Walrasian equilibrium; seeking of a fair distribution that is Pareto-optimum; maximization of the QoS observed by the user; use of QoS profiles that providing an actual utility function; allowance and encouragement of changes in demand from users over time; minimization of signaling and reservation requirements; and creation of a strategy that is independent of traffic types.

The various embodiments of the invention will now be mentioned.

The invention resides, generally, in a microeconomic approach to flow control for a network of switches connecting users. In a first embodiment of this approach, a plurality of network brokers correspond to a plurality of users, including a first network broker corresponding to a first user and a second network broker corresponding to a second user. There is a step of providing a quality of service profile for the first user to the first network broker and of providing route information relating to a route from the first to the second user, the route including one of the switches defining a first switch. The method further includes providing from the first user to the first network broker a present desired bandwidth value and sending respective current price quote information from the first switch to the first network broker. The first network broker selects a resource utilization rate based on: a respective resource budget of the first user, the quality of service profile of the first user, the present desired bandwidth value for the first user, and the current price quote information of the first switch. Transmission ensues from the first user to the second user at the selected resource utilization rate.

The approach according to a second embodiment of the invention provides that the first switch sends updated price quote information at a timing based on changes in the demand at the first switch.

In a third embodiment of the invention, the updated price quote is defined by:

$$p_{n+1}^i = p_n^i + c \cdot \left( \frac{bw_{recv}^i - \alpha \cdot BW_{total}^i}{\alpha \cdot BW_{total}^i} \right)$$

where: $p_{n+1}^i$ is the updated price quote; $p_n^i$ is the current price for bandwidth at the switch; $BW_{total}^i$ is the bandwidth capacity of the switch; $bw_{recv}^i$ is the total traffic entering the switch; and c and $\alpha$ are constants.

A fourth embodiment of the invention provides that the route from the first to the second user is predetermined and that the route further includes another one of the switches defining a second switch. In this embodiment, the selecting of the resource utilization rate by the first network broker is based also on respective current price quote information of the second switch.

In a first variaton on the fourth embodiment, the second switch separately sends the respective current price quote information to the first network broker. In a second variation, the second switch sends the pricing information to the first switch, and the first switch provides a composite price to the first network broker.

In a fifth embodiment of the invention, multiple routes are available, and the network broker may specify a route. In this embodiment, the network broker may compare prices of the different routes and select the best price.

In a sixth embodiment of the invention, the first network broker internalizes the externalities of its projected use. In particular, the network broker predicts how the current price quote information will change in response to the first user transmitting to the second user, and makes its selection of a resource utilization rate taking into account the projected effects of its own consumption on the switch or switches along the selected route.

The invention will be understood from the following detailed description, taken in conjunction with the drawings as now described.

DETAILED DESCRIPTION OF THE PREFERRED EMBODIMENTS

The presently preferred embodiment of the invention will now be described. In particular, there is described the pricing technique of the preferred embodiment of the invention, a proof that the pricing strategy according to the invention achieves a Walrasian equilibrium, how a fair Pareto-optimal distribution is reached, and simulation results of various networks and traffic types (including comparison to a traditional CAC method).

Figure 1:
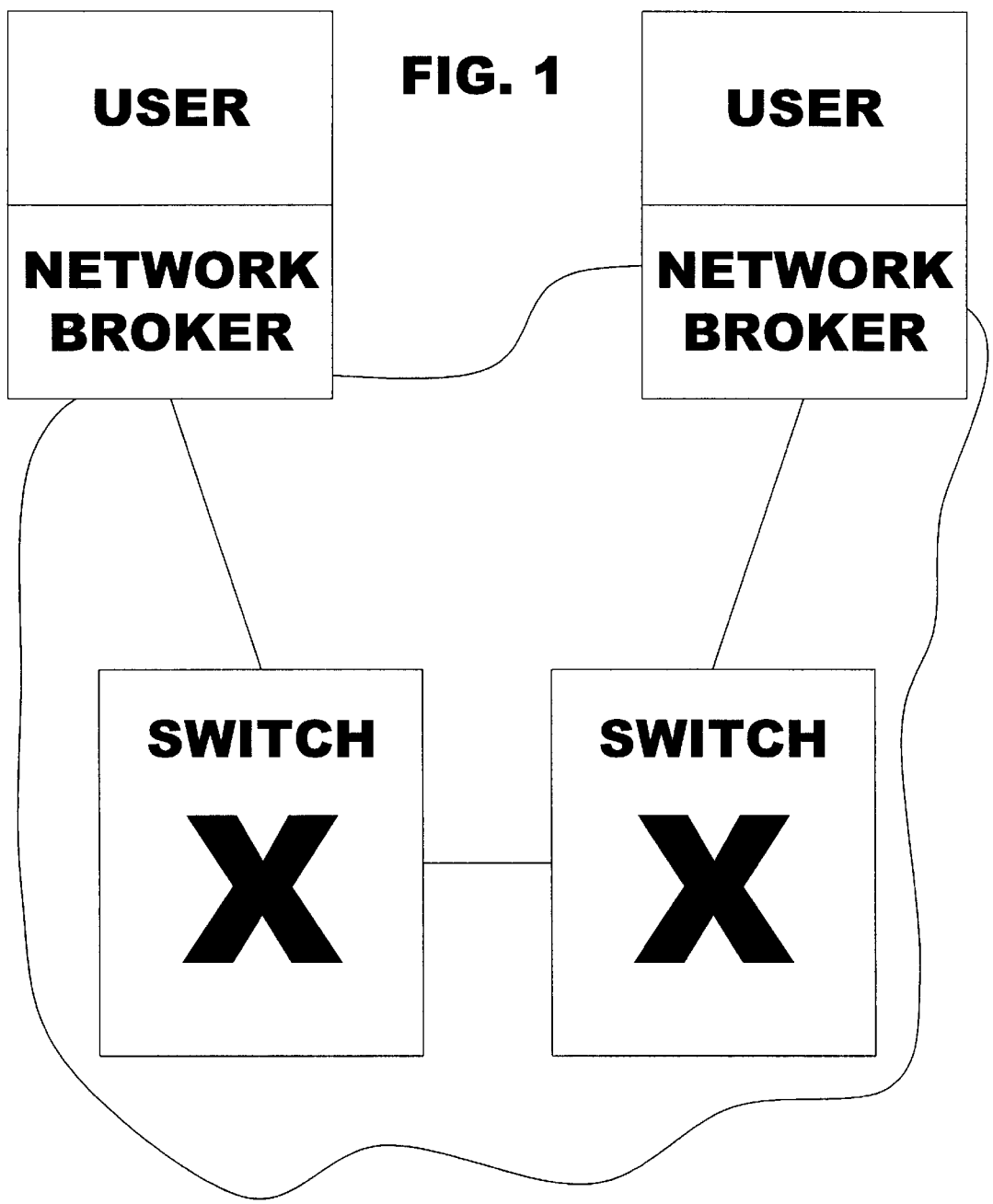
FIG. 1 is an example network consisting of users, network brokers and switches.

This flow control method according to the invention is based on microeconomics, where pricing is done to promote high utilization and fair distribution. There are three entities in this network economy: users, Network Brokers (NB) and switches, as seen in FIG. 1. While there are many resources in a computer network, this discussion focuses on the pricing of bandwidth. Since bandwidth is a non-storable item, users will be charged based on usage (similar to electricity).

Users of the network compete for limited resources. Their demands impact the price of resources they desire. Users also have a finite amount of wealth and must efficiently purchase resources accordingly. This may require reducing demands based on their budget and current prices. These decisions are made with the aid of a network broker.

A user wishing to use the network can only do so through a Network Broker (NB). A NB is located between the user and the edge of the network. The NB works as an agent to the user, monitoring the application needs and the prices. Using this information the NB charges the user for their consumption. Charging the user is analogous to a meter since the NB continuously charges the user at the current consumption rate and current prices. The NB also determines the amount of resources that is affordable and will maximize the user's utility. Once the resource values are determined, the user can start sending immediately. No reservation or signaling is required.

Switches have the resources sought after by the users. For this reason resources are priced to reflect their scarcity. The price calculation is performed at the switch based on local supply and demand; therefore the price from one switch does not directly affect another. Once a new price has been calculated, it is forwarded to the NB's using the resources.

Pricing information may be provided in a variety of ways. Routing may be fixed, and the NB thus may not choose between routes. In such a situation, e.g., the NB might transmit a call setup request to the network along the fixed route. In response to the call setup request, the switches all might individually reply directly to the NB by sending their own respective price quote. Alternatively, the last switch in the route might send a price quote to the next previous one, which adds that price to its own and sends this cumulative price quote to the next switch preceding it along the route and so on, thereby providing the NB a price quote for the route as a whole. Of course, this might be done equally well by the first switch on the route being the first to provide a price quote, and giving the quote to the next switch on the route, which gives its own price plus the price of the first switch to the next switch, and so on until the last switch on the route provides to the NB the price quote for the entire route. Alternatively, the switches might periodically broadcast price quotes, and the NB would collect and add them to arrive at a price quote for the entire route. In this last alternative, the NB does not need to send a call setup request to obtain pricing information, but it does need to keep track of current price quotes for all possible switches it might use.

In the situation in which the NB may request a specific route, the foregoing alternatives are all possible, but now the NB may additionally compare the prices for different routes and may select from the cheapest among them. Alternatively, the NB might check routes until the first route providing acceptable performance is detected. Upon such detection, the NB might then select that route without actually determining whether it is the absolute cheapest route. Alternatively, the NB might check for the first affordable route and select that route.

These are the basic entities and interactions of the pricing method according to the invention. From the general description provided, there are two main advantages. First, NB shifts the majority of the decisions away from the user. This reduces the need for users to make consumption decisions. Second, switches work independently from each other, making this technique decentralized and very scalable.

A description will now be made with respect to the network flow control system according to the invention as it is implemented at the switches.

The pricing policy of bandwidth is based on a Walrasian economic model. The price is adjusted based on supply and demand of resources at that switch until an equilibrium price is obtained (for additional information in this respect, see R. Leftwich and R. Eckert, *The Price System and Resource Allocation*, the Dryden Press, 1982, which is incorporated herein by reference for its useful background information). This model has several advantages including Pareto-optimal distribution and price stability. The computation is performed at the switch and the new information is sent to each NB using it.

Figure 13:
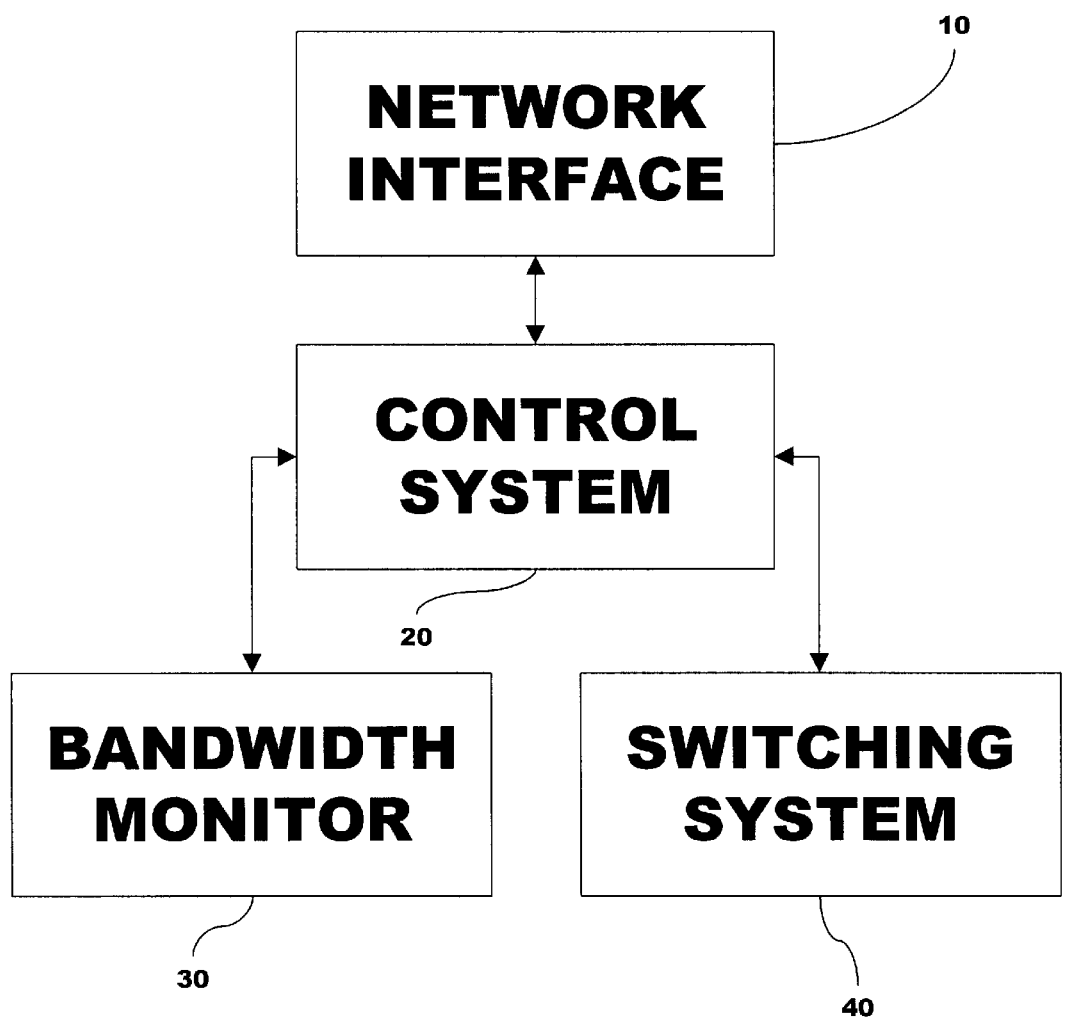
FIG. 13 shows a switch according to an embodiment of the invention.

FIG. 13 shows an exemplary switch according to an embodiment of the invention. In particular, the switch interfaces with the network through a network interface 10, which constitutes a means for interfacing with the network. The switch monitors bandwidth through a bandwidth monitor 30 constituting means for monitoring bandwidth. The switch performs its switching function with a switching system 40 constituting means for switching. The operation of these components is controlled by a control system 20 constituting means for controlling the switch operations. As will be readily appreciated, the foregoing may be separately implemented in computer hardware and software, or may be combined in various ways as software processes on a single set of hardware.

Each switch, $s^i$, will store (e.g., in control system 20 or in network interface 10) and send (via network interface 10) the following information:

Current price ($p_n^i$). This is the current price for bandwidth at the switch.

Total Bandwidth ($BW_{total}^i$). This is the bandwidth capacity of the switch. This value will represent the supply of bandwidth and will be constant. This information may be provided within control system 20 or may be provided to the control system 20 by bandwidth monitor 30.

Received Bandwidth ($bw_{recv}^i$). This is the total traffic entering the switch. This value will represent the demand for bandwidth and will change over time depending on the users. The bandwidth monitor 30 may provide this information to control system 20.

Constants c and α. These constants are used in the price update equation (see Equation 1).

This information is collectively called a price quote, $pq^i$. Note all information is local, so pricing does not require signaling from other switches. Since the price will reflect the current supply and demand for bandwidth at the switch, the price will change periodically over time. Using the current information, switch i (e.g., in the control system 20) updates its price as follows, $$p_{n+1}^i = p_n^i + c \cdot \left( \frac{bw_{recv}^i - \alpha \cdot BW_{total}^i}{\alpha \cdot BW_{total}^i} \right) \qquad \text{Equation 1}$$

The form of the price equation is referred to as a tâtonnement process (for background, see W. Nicholson, *Microeconomic Theory, Basic Principles and Extensions*, the Dryden Press, 1989, incorporated by reference). The new price is equal to the previous price plus a correction function. The correction function provides feedback based on the demand (received traffic) and the supply (bandwidth available). The bandwidth available is the total bandwidth times a constant $\alpha$, where $0<\alpha\leq 1$. This is done to increase the price more rapidly after some percentage ($\alpha$) of the total bandwidth has been reached. This is evident from the equation, since the price will only increase if the numerator is positive ($bw_{recv}^i > \alpha \cdot BW_{total}^i$). The price will decrease as the demand decreases and increase as the demand increases. An equilibrium price $p^{*i}$ is reached at switch i when the supply equals the demand. The constant c amplifies the feedback signal and its value ultimately controls how quickly the price will increase or decrease. Assuming the supply curve has a positive slope, the equilibrium price $p^{*i}$ is stable. Note that the equation can yield negative prices. It is assumed that the price will not fall below a certain non-negative minimum price (set by the switch).

The calculation (Equation 1) is performed periodically at the switch. The time between updates should be at least twice as long as the longest propagation delay to any NB using the switch. This ensures that all NB's using the switch will have the same price. It also reduces the number of price quotes sent by the switch. After the new price $p_{n+1}^i$ is calculated, a new price quote is forwarded. This is done only if the new price is different from the previous price. Once the NB receives the price quote, it decides if its current consumption should change.

Figure 14:
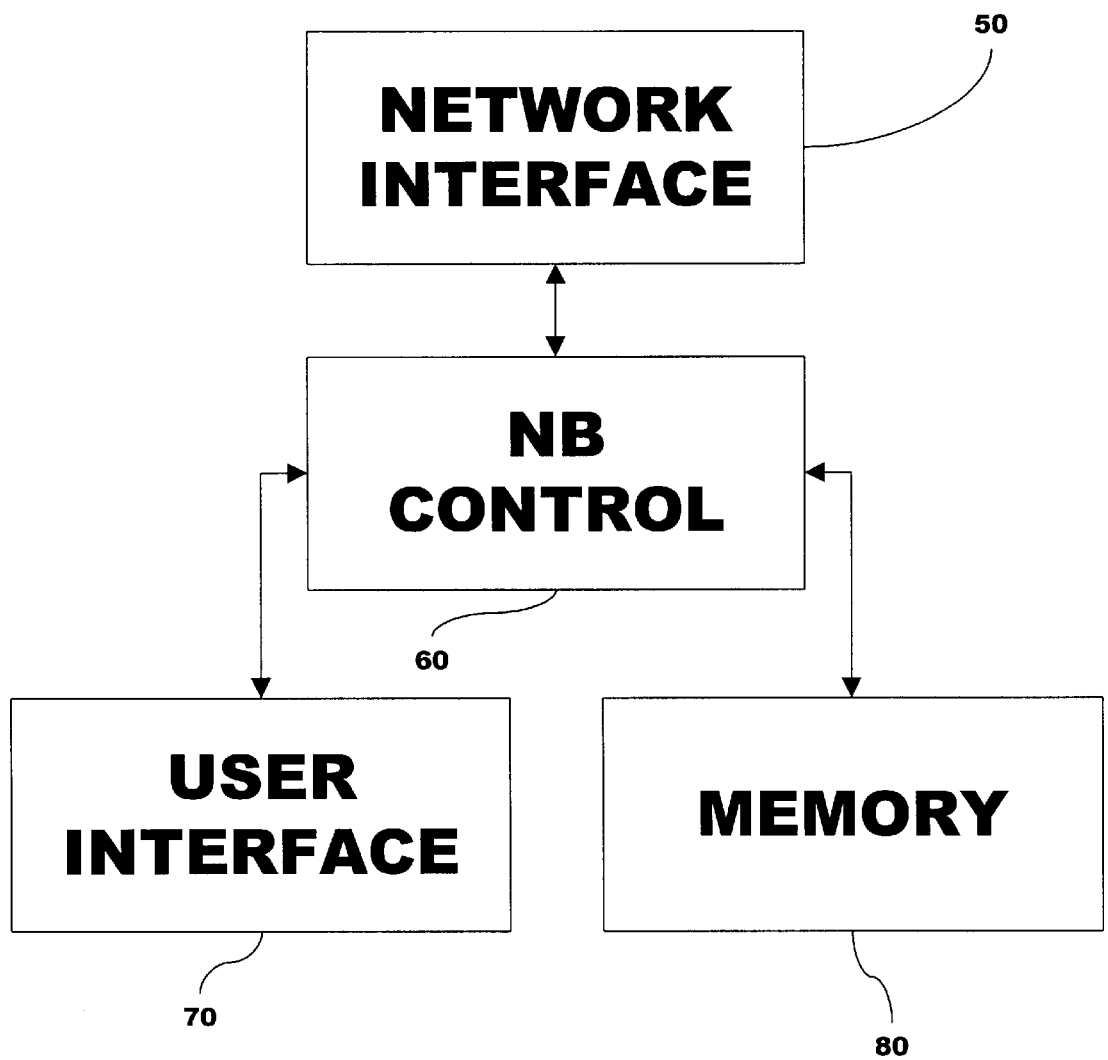
FIG. 14 shows a network broker according to an embodiment of the invention.

A description will now be made with respect to the network flow control method according to the invention as it is implemented in the network brokers (see FIG. 14).

As described in the overview, users can only use resources through a network broker (NB). A network broker may be provided with a NB control 60 for controlling the operation of the network broker, and constituting means for controlling network broker operations. The network broker may be provided with a network interface 50 whereby an interface with the network is provided. The network broker may be provided with a memory 80 for storing various information as described below. The network broker may further be provided with a user interface 70 for interfacing with a user or with user processes. The user provides information to the NB, such as desired bandwidth, desired satisfaction level, etc., via user interface 70.

As will be readily understood, the foregoing may be implemented by hardware and software in various combinations. For example, the memory 80 may be an integral part of a computer operating as the NB control 60. Different hardware and software combinations will be evident to those of skill in the art, including arrangements in which a single computer is provided with a common processor that includes a user task and a NB task.

Assuming a user wishes to execute an application between himself and a destination, he must initially select a NB and provide some information. In the embodiment now being described, each user is shown as having its own NB. The NB collects (via interfaces 50 and 70) and stores (in memory 80) the following items:

QoS profile. The QoS profile serves as a utility curve that relates a certain resource amount to a particular satisfaction level, and is an integral part of the price strategy. The QoS scores range from one to five, with five representing perfect perceived quality, four representing excellent quality, three representing good quality, two representing minimal quality, and one representing very poor quality (for more information about QoS profiles, see D. Reininger and R. Izmailov, "Soft Quality-of-Service for VBR+ Video," in Proceedings of the International Workshop on Audio-Visual Services over Packet Networks, AVSPN'97, September 1997, incorporated by reference). The user may specify a level of satisfaction, or a satisfaction index to the NB, which the NB may use to determine a threshold for minimum acceptable bandwidth (see below).

Desired Bandwidth ($bw_{desired}$). This is the amount of bandwidth the application needs for a perfect QoS score. If the application is VBR, this value will change over time.

Switches. The NB stores the route, R, that connects source to destination. Where R consists of k switches, $\{s^i, i=1 \ldots k\}$.

Price quotes. For each switch on R, a single price quote, $pq^i$, is collected. Where $\vec{pq} = \{pq^i, i=1 \ldots k\}$ is the vector of price quotes for the route. Price quotes will change over time, since they represent local supply and demand.

Budget. Once a route is selected, the user must provide a vector of k budget rates $\vec{b}$. Where $\vec{b} = \{b^i, i=1 \ldots k\}$ and $b^i$ corresponds to switch $s^i$. While the method described by example herein uses budget rates, a single endowment at the beginning of a session could be used. This would necessitate defining how the endowment is spent during the session. To simplify simulation and analysis, budget rates are used instead Separate budgets are used to localize the effect of prices to each switch. This prevents a user from spending all of their budget on one expensive switch. Of course depositing and withdrawing to and from these individual budgets is possible and perhaps advantageous.

A description will now be made as to how events are implemented in the network flow control method of the invention.

Figure 2:
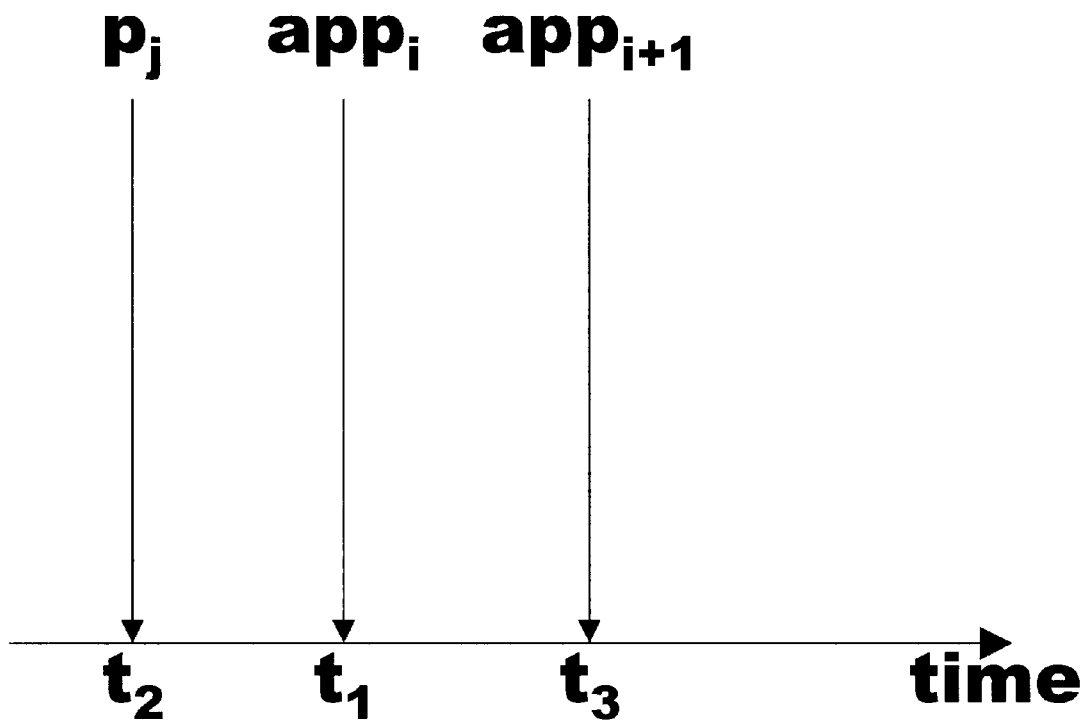
FIG. 2 shows example application and price events.

For the duration of the user's session events will occur randomly which may require the user to change the amount of bandwidth used. There are two events important to the NB as seen in FIG. 2, application and price. Application events occur when there is a change in the resource requirements. These events occur randomly and the ith application event will be denoted as $app_i$. The second event indicates a price change. These events occur semi-periodically. The jth price change will be denoted as $p_j$. As these quotes are received, the NB will store the most current information. When the NB wishes to change the amount of bandwidth used, it performs the following steps: (1) the NB checks that it has a price quote for each switch in the route; and (2) using $\vec{pq}$, $bw_{desired}$, the QoS profile, and the budget rates ($\vec{b}$), the NB determines the bandwidth to use ($bw_{use}$). This is the amount of bandwidth actually used and is based on the application requirements and budget constraints. The bandwidth used can be written as a function, $$bw_{use} = f(\vec{pq}, bw_{desired}, \text{QoS profile}, \vec{b}) \qquad \text{Equation 2}$$

and may be less than the desired bandwidth $bw_{use} \leq bw_{desired}$ due to the prices.

When a user wishes to start a session, he must first be able to afford enough resources that will result an acceptable QoS score (exactly what defines an acceptable QoS score is determined by the user). Otherwise he is not permitted to enter the network. This prevents overloading the network so that each user may receive a good QoS, instead of many users receiving a poor QoS. The pricing method, in effect, thus provides a form of connection admission control but, in contrast to traditional CAC, the control is distributed and is provided by the NB in accordance with user satisfaction information.

As previously described a change in the bandwidth used may occur when an application event or when a price event is encountered. If the new $bw_{use}$ is a different value, the user will start sending at the new value immediately. There is no need for direct confirmation/feedback from the switches.

Now a description will be given of how the bandwidth to use is determined.

If an application or price event occurs, the $bw_{use}$ may change. However, it should only occur if the change (in price or $bw_{desired}$) is significant. In the simulations a 10% change (in $\vec{p}$ or $bw_{desired}$) was considered significant. If the change was significant, the NB will first calculate the maximum and minimum bandwidth that can be used. The maximum bandwidth that can be used at switch i is, $$bw_{max}^i = \frac{b^i}{p^i}, i = 1 \ldots k$$

therefore the maximum bandwidth the NB can afford is, $$\hat{bw}_{max} = \min_{i=1 \ldots k} \{bw_{max}^i\}.$$

Note this equation maximizes the bandwidth at the current prices. The minimum bandwidth that can be used is determined from the QoS profile and the $bw_{desired}$. It is possible that $\hat{bw}_{max} < bw_{min}$ due to the QoS constraint, prices and budgets. If this case arises, the user must either increase the budget rate, accept a lower QoS, or drop the connection.

Figure 15:
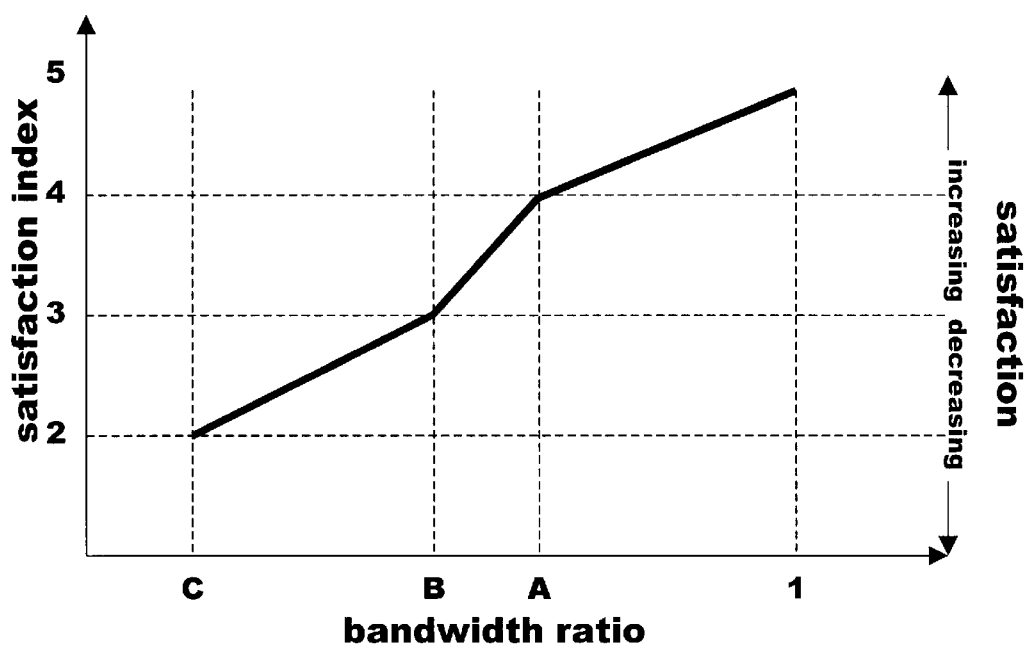
FIG. 15 shows a QoS profile used to explain an embodiment of the invention.

Reference is now made to FIG. 15, which explains by example a QoS profile which, as already explained above, is empirically derived. As will be appreciated, the QoS profile may be simple or multi-faceted. The latter is the more useful approach. This is because users usually undertake different applications. In this example, the user has different valuations for bandwidth depending on whether the user wishes to perform teleconferencing, Video on Demand (VoD), or Multimedia on Demand (MoD). Here, VoD relates to "action" type applications, and MoD relates to interactive type applications. These broad categories may be added to or deleted from.

In FIG. 15, the plotted curve is called the softness profile and is derived by setting B at a value shortly to be described; by setting A at about 1.1 times B; and by setting C at about 0.7 times B. In FIG. 15, the horizontal axis is the bandwidth ratio. The bandwidth ratio is the ratio of "purchased" bandwidth to "desired" bandwidth. If the bandwidth ratio is 1, it means the user can afford the bandwidth he desires and thus the satisfaction is total (indicated as 5 in the vertical axis, which represents a satisfaction index). The value B is the percentage of the desired bandwidth corresponding to a level of performance which, although not to the level desired, provides good quality of service to the user for the given application. In other words, to maintain good (i.e., acceptably degraded) performance, the application needs to purchase at least B % of the desired bandwidth. Table 1 shows an example of how B may vary according to the different categories of applications. Thus, once the NB gets the price, it uses the application's particular QoS profile to determine how much bandwidth it should ask the network for. The exact form of the softness profile depends on the application.

Table 1 shows a range of values for B. The ranges shown in the table have been empirically determined by the inventors. For teleconferencing, it has been determined that a range for B (i.e., for good performance) is from 0.2 to 0.6. Differences in personal taste or physical characteristics might sway a user toward one end of the range or the other end.

It will be understood that the fixing of B sets a threshold for a given application with respect to a good, although not ideal, level of performance. In FIG. 15, the character A represents a point at which the quality is higher than B. Thus, when performance is desired to be more than merely good (i.e., "excellent" or "very good" quality), then the NB might be directed to purchase bandwidth using A as a threshold. Likewise, the character C in FIG. 15 represents a low quality threshold below which performance is so degraded that the application is substantially nonfunctional. Sometimes, however, a user might desire to have a connection, even if the is quality is very poor. In such a case, C could be used as a threshold (i.e., "minimal" quality).

To explain this by way of analogy, it will be recognized that when a document is printed by a typist at a word processor, there is often a dialogue requesting to know whether the print quality is to be draft, normal, or best. Here, in a similar fashion, a user might specify to the NB whether an application is to be executed with minimal, good, or excellent quality.

To put it another way, point C may be thought of as the minimum performance threshold, and the range between point C and point B may be thought of as a range providing very degraded performance. Point B may be thought of as the good performance threshold, and the range between points B and A may be thought of as a range providing acceptable degradation. Point A may be thought of as the improved performance threshold, and the range between point A and point 1 may be thought of as a range providing only slight degradation. Finally, point 1, as mentioned above, may be thought of as the point at which the user's desired bandwidth is completely satisfied.

As FIG. 15 shows, point 1 provides a satisfaction level of 5; point A provides a satisfaction level of 4; point B provides a satisfaction level of 3; and point C provides a satisfaction level of 2.

Thus, the user may optionally select that an application is to be executed with good quality. The soft profile of FIG. 15 would thus show that the NB must purchase at least B % of the desired bandwidth. If the user had set the quality level at excellent (i.e., satisfaction=4), the soft profile of FIG. 15 would have shown that the NB must purchase at least A % of the desired bandwidth. Depending on the actual implementation, the NB might always purchase as much bandwidth as it could up to point 1, or the NB might seek to conserve its budget by purchasing A % of the desired bandwidth even where it could afford the entire desired bandwidth.

TABLE 1

| Application | Range for B |
|---|---|
| teleconferencing | 0.2–0.6 |
| VoD | 0.5–0.7 |
| MoD | 0.3–0.8 |

After the $\hat{bw}_{max}$ and $bw_{min}$ have been calculated, the $bw_{use}$ can be determined. The following procedure will attempt to find the maximum bandwidth at the current prices and budgets. It also calculates the price impact of the change in consumption on itself. In microeconomics this is referred to as internalizing externality, an important point in determining a fair Pareto distribution (see Nicholson, mentioned above). The initial $bw_{use}$ is, $$bw_{use} = \begin{cases} bw_{desired} & \text{if } \hat{bw}_{max} \geq bw_{desired} \\ \hat{bw}_{max} & \text{if } \hat{bw}_{max} < bw_{desired} \text{ AND } \hat{bw}_{max} \geq bw_{min} \\ 0 & \text{otherwise, } bw_{min} \text{ did not exist} \end{cases} \quad \text{Equation 3}$$

Using the switch variable information (from the price quotes), the NB must determine if the $bw_{use}$ will cause a price change that it cannot support, minimizing the externality of the bandwidth used. The maximum price that the NB can support at switch i is, $$\frac{b^i}{bw_{use}} \quad \text{Equation 4}$$

The new price caused by $bw_{use}$ at switch i is, $$p^i + c \cdot \left( \frac{bw_{use} + b^i_{recv} - \alpha \cdot BW^i_{total}}{\alpha \cdot BW^i_{total}} \right) \quad \text{Equation 5}$$

Using Equation 4 and Equation 5, the following inequality provides a bound on feasible $bw_{use}$ values, $$b^i \geq bw_{use} \cdot \left[ p^i + c \cdot \left( \frac{bw_{use} + b^i_{recv} - \alpha \cdot BW^i_{total}}{\alpha \cdot BW^i_{total}} \right) \right] \quad \text{Equation 6}$$

Solving Equation 6 for $bw_{use}$ yields the bandwidth at switch i whose price change the NB can support. The inequality (Equation 6) has a closed form or it can be solved iteratively. An iterative approach would first test the inequality at the initial $bw_{use}$ given from (Equation 3). If it does not hold, reduce $bw_{use}$ by a constant value (smallest division of bandwidth allowed) and retest. This procedure would repeat until either a $bw_{use}$ that satisfies the inequality is found or $bw_{min}$ is reached. This procedure is repeated for all switches on the route R. Using this method the user maximizes their own utility while minimizing the impact of externality.

In other words, the NB predicts the effect its own actions will have on the network. It does this best when it predicts based on knowledge of the price update formula used by the switches themselves and of the parameters used (i.e., c, $BW_{total}^i$) The effective price that the user sees therefore includes the effect that his demand imposes on others.

As described earlier, once the NB has determined its $bw_{use}$ it will start sending immediately at this rate. No signaling is performed. This technique provides a significant reduction in overhead, however an over allocation of resources may occur. Consider the following scenario. Assume many users are using one switch and the price has reached an equilibrium value. Now assume one user ends their session and this reduction of bandwidth results in a lower price. If the remaining users react to this lower price, over-allocation of resources may occur. One simple approach to reduce this effect is to require each user to divide their new $bw_{use}$ by the number of users remaining at the switch. This should only be done if the renegotiation was the result of a lower price. An over-allocation may still occur if many users using a switch start sending at a higher rate simultaneously due to their application (not price); however this would require a correlation of these events. In general, adjusting the price based on $\alpha \cdot BW_{total}$ and the high capacity of most switches diminishes the significance of this problem.

A discussion now will be made as to optimality of allocation.

As with any allocation strategy there are certain optimal allocation goals. Since pricing is used, optimality will be described in microeconomics terns. There are two important goals this technique strives for; Pareto-optimal allocation and Walrasian equilibrium.

Pareto-optimality is the allocation of finite resources such that no sub-set of users can improve on their allocation without lowering the utility of another. For example, assume 3 users and 6 units of a resource exists. Also assume the need for resources is insatiable. Allocating two units per user would result in a Pareto-optimal allocation, since no user can improve their utility without some other user lowering theirs. However allocating only one unit to the first two users and four to the last user is Pareto-optimal as well. Therefore using the definition above, Pareto-optimal allocations can be unfair.

A tâtonnement process will search for a price, for which the final allocation of resources is Pareto-optimal (for a proof of this, see A. Takayama, *Mathematical Economics*, the Dryden Press, 1974, incorporated by reference). The addition of pricing and budgets can reduce the possibility of an unfair Pareto-optimal allocation. Budgets provide users purchasing power, which in effect create priorities (to those with the larger budgets). The result is each user gets their fair share, with respect to their budgets.

The Walrasian equilibrium price (p*) occurs when a price is reached such that the demand equals the supply. At this point, the resources are fully utilized. If the demand changes, pricing mechanism should alter the price to return to equilibrium. A proof that the pricing technique according to the invention achieves this is now given.

Walrasian price stability states that prices will adjust in response to supply and demand. For that reason, adjustments in the price are driven by knowledge from the market concerning the excess demand at a specific price. For a switch in the network, define the excess demand at price p as, $$ed(p) = (bw_{recv}^p - \alpha \cdot BW_{total}) \quad \text{Equation 7}$$

Figure 3A:
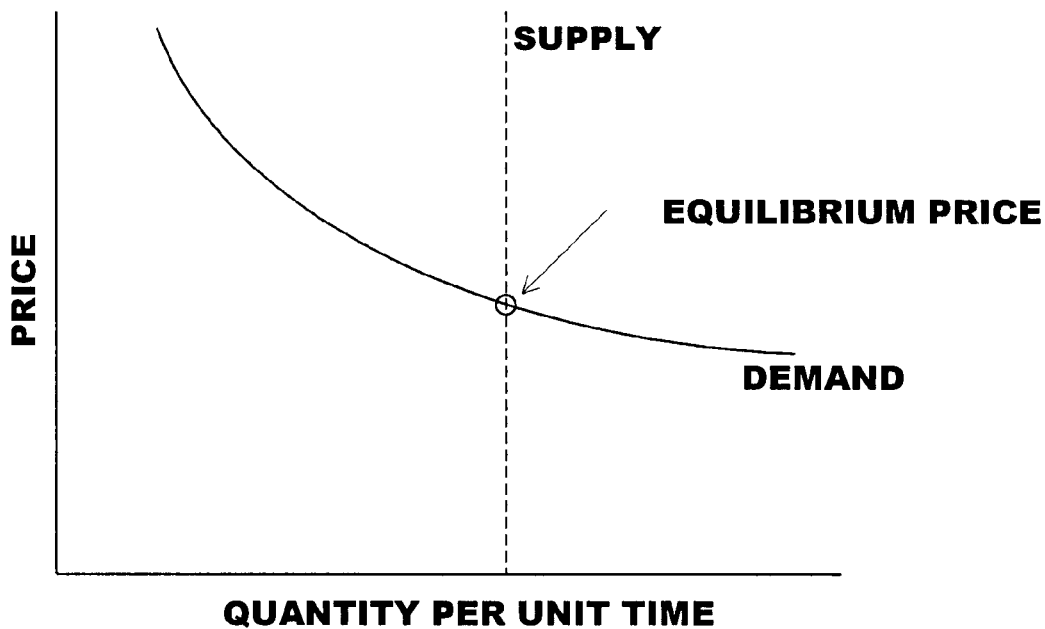
FIGS. 3A and 3B show example supply, demand and excess demand curves.
Figure 3B:
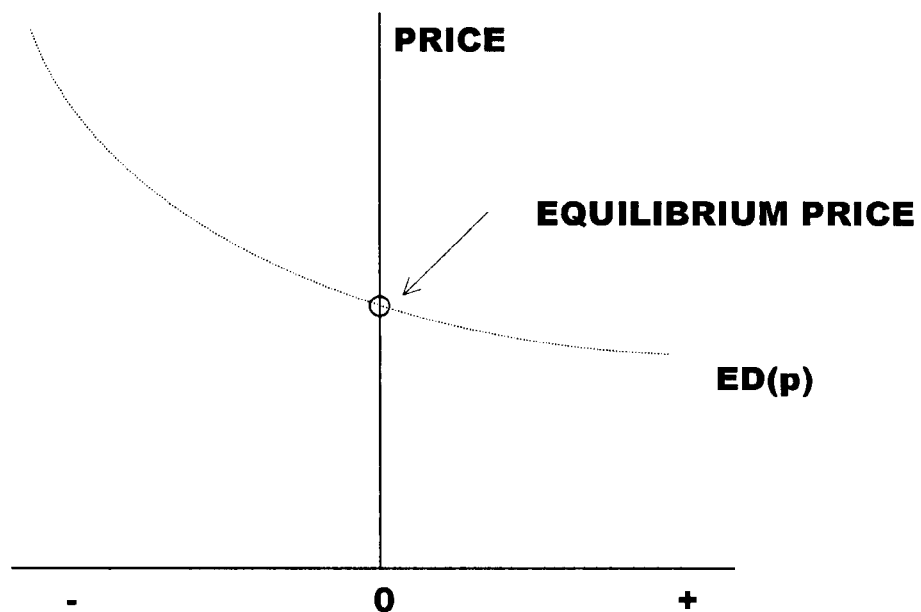

Example supply, demand and excess demand curves for the system are given in FIGS. 3A and 3B. As seen in this figure, the demand curve has a negative slope. This represents that an increase in price will reduce demand. The supply curve is a vertical line, because the supply of bandwidth is constant (the switch does not produce bandwidth). From the supply and demand curves the excess demand curve can be derived.

Using these graphs the behavior of the price rule (Equation 1) can be predicted. Stability is defined as, $$\lim_{n \to \infty} p_n \to p^*$$

The price rule will increase the price p when it is lower than equilibrium price p*. This is done because a positive excess demand exists. When p is greater than p*, it is lowered towards p* because the excess demand is negative. Therefore the price rule always moves the price towards p*, resulting in a stable equilibrium price. It should be noted that the slope of the supply curve must be positive for this to be true.

The equilibrium price can be proven stable mathematically as well. Using the excess demand equation, the price adjustment from the price equation (Equation 1) over time can be written as, $$\frac{dp}{dt} = c \cdot \frac{ed(p)}{\alpha \cdot BW_{total}} \quad \text{Equation 8}$$

Since $\alpha \cdot BW_{total}$ is constant (the switch does not produce bandwidth) the constant k may be defined as, $$k = \frac{c}{\alpha \cdot BW_{total}}$$

Using the previous definitions, the price adjustment can be rewritten as, $$\frac{dp}{dt} = k \cdot ed(p) \quad \text{Equation 9}$$

The price adjustment can be viewed as a first-order differential equation. The local response of the equation can be analyzed in the region of an equilibrium price using the Taylor approximation, $$\frac{dp}{dt} = k \cdot ed'(p_*) \cdot (p - p_*) \quad \text{Equation 10}$$

Figure 4:
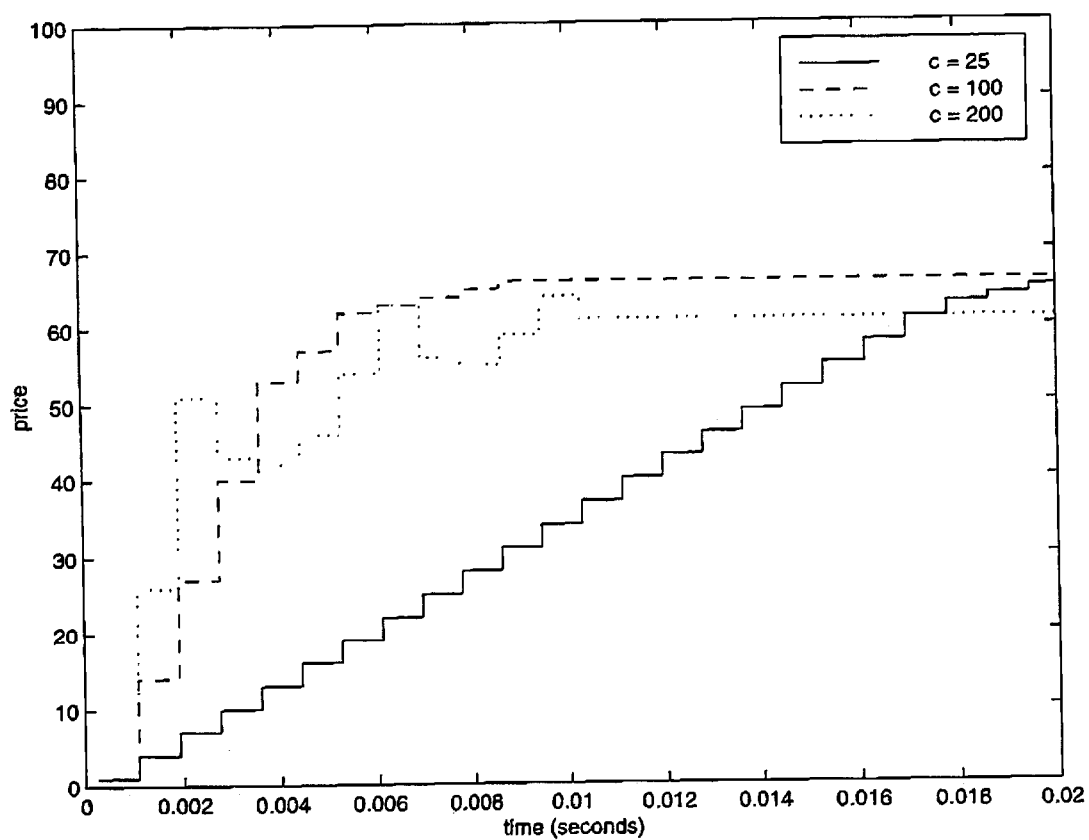
FIG. 4 shows a price change over time using different c values.

The general solution to this equation is, $$p_n = (p_0 - p^*)e^{k \cdot ed'(p^*) \cdot t} + p^* \quad \text{Equation 11}$$

where $p_0$ is the initial price. As seen from the solution, the system is stable as time increases. However it must be the case that $ed'(p^*)$ is negative, which is shown in FIG. 3B. The number of iterations required to reach the equilibrium price depends on the type of traffic, the budgets and the constant c. The switch has no control over first two items, yet some basic information can help in the selection of c. As an example, the impact of c on the number of iterations is given in FIG. 4. Values too low will cause the price to change slowly, resulting in more iterations. In the graph a c value of 25 requires 22 iterations, while c values of 100 to 350 require approximately 12 iterations. However values too large may raise the price too quickly, causing some users to exit before a price correction can be made.

A discussion will now be provided concerning experimental results.

In this section the pricing strategy is compared to a traditional CAC scheme. This is done to measure the benefits of pricing to current allocation and CAC techniques. While previous efforts have shown theoretically the benefits of pricing, none have performed experiments with large networks and various traffic types. Simulation results will show that the pricing technique according to the invention achieves a fair Pareto distribution and a Walrasian equilibrium as well as high network utilization.

Figure 5:
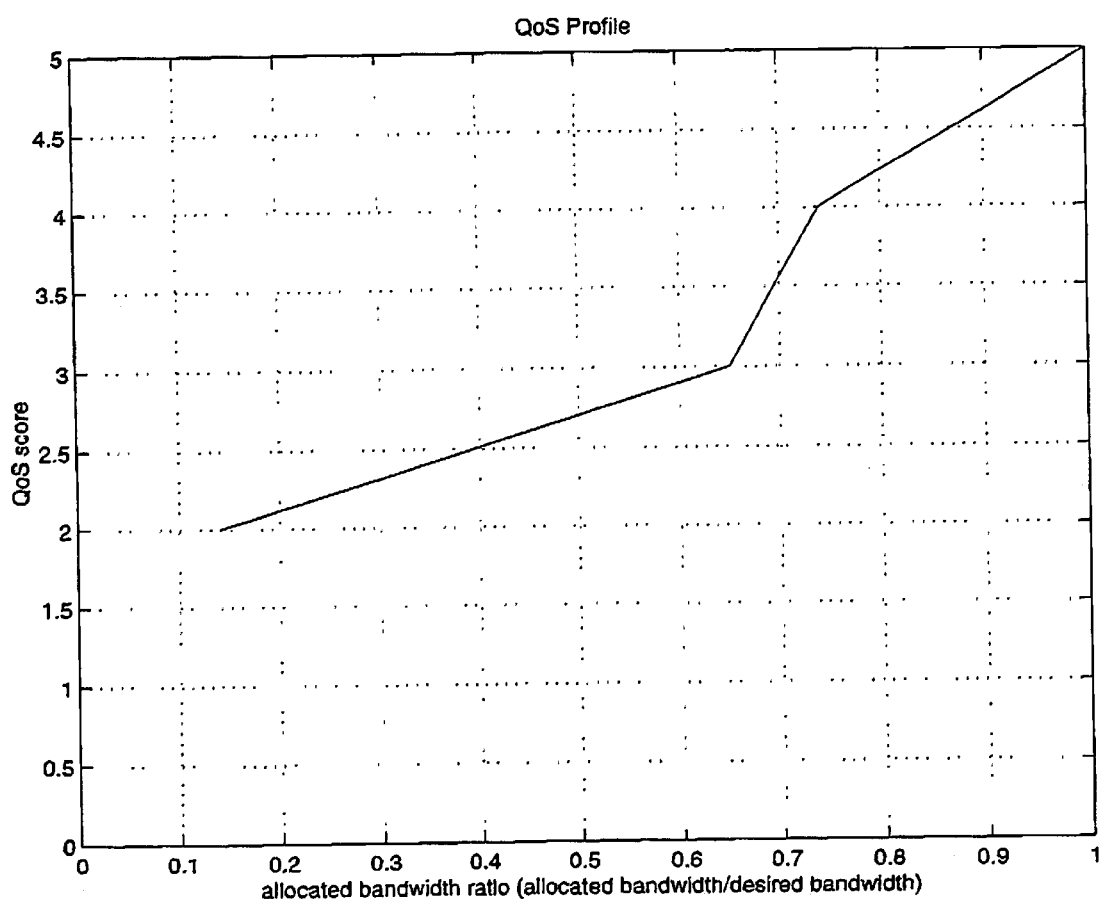
FIG. 5 shows the QoS profile used in each experiment.

Three sets of experiments were performed with CBR, VBR and interactive VBR traffic. Each source used the QoS profile given in FIG. 5. This profile was generated from an actual MPEG video application using the VBR traces (see Reininger and Izmailov, above).

CBR traffic is characterized in that the bit rate for the connection remains constant. In other words, according to the invention, the NB would specify at the beginning of the call the bandwidth to be purchased. That level of bandwidth would be paid for during the entire call. With CBR traffic and connections, the bandwidth selected should be sufficient for whatever takes place during the call, even if the full bandwidth is used for only a short time.

VBR traffic is characterized in that the bit rate for the connection is variable. In operations according to the invention, the NB would dynamically be provided with desired bandwidth figures, and would purchase the right amount of bandwidth to meet the present need. Such an approach is more efficient in terms of bandwidth utilization that CBR, but makes for a more complex handling of the connections by the network. VBR is more efficient than CBR for bandwidth utilization because users purchase bandwidth more closely in line with their present needs, and do not "reserve" so much excess bandwidth in anticipation of possible peak requirements.

Figure 6:
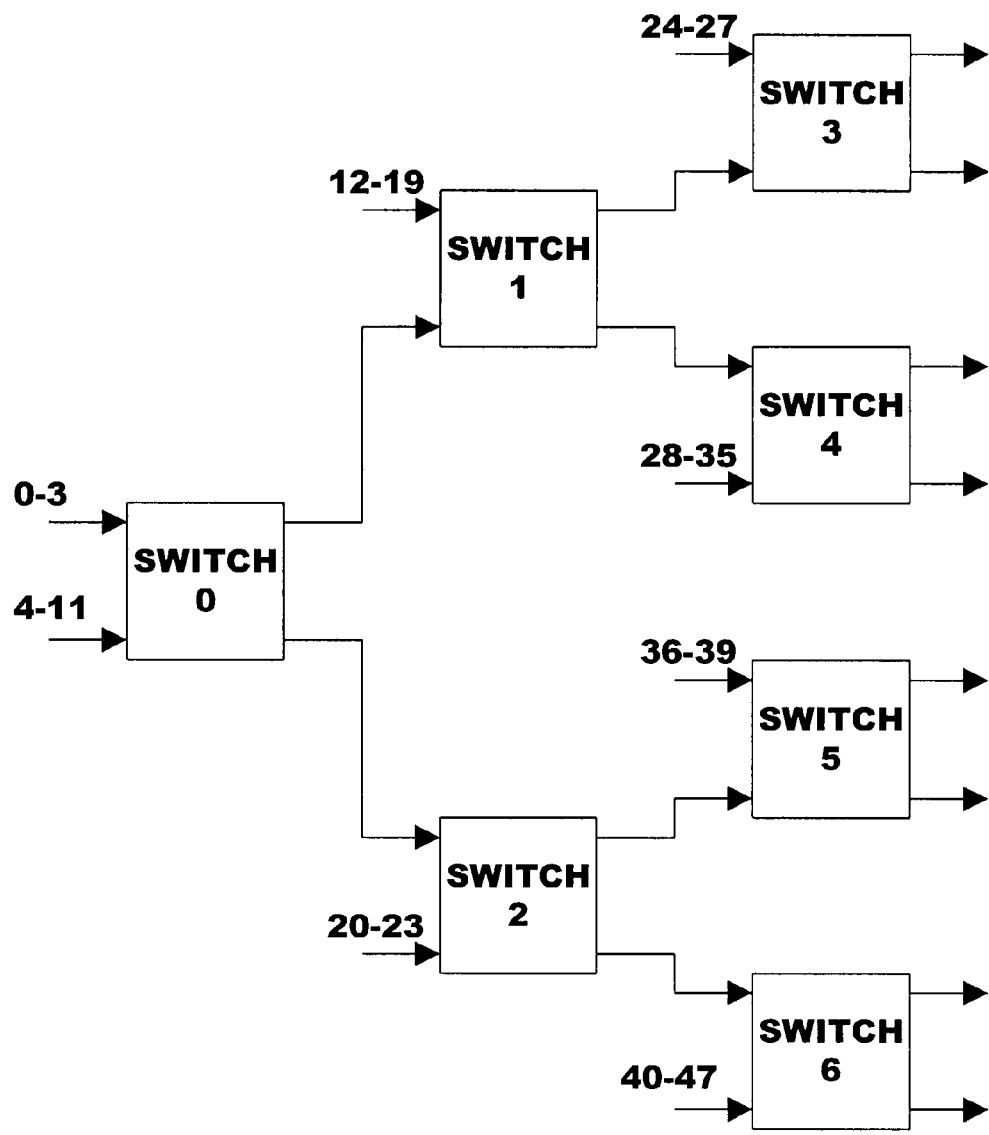
FIG. 6 shows the network used for constant bit rate (CBR) and variable bit rate (VBR) experiments.

The network in FIG. 6 was simulated for the CBR and non-interactive VBR experiments. The network consists of seven switches. Each switch had a capacity of 155 Mbps with twelve input sources. Bandwidth could only be used in 250 Kbps increments. Links interconnecting switches were 1000 km in length. Links connecting sources to their first switch were 25 km in length. Users had either one, two, or three hop routes and entered the network in one second intervals (starting with user 0 and ending with user 48).

For each experiment, the pricing strategy had the following initial values. Each budget, $b_i$, was set to 0.30/sec (the denomination of the price has been omitted for generality). Since all users have the same budget vector, they are considered equal (in terms of purchasing power). This should cause all users to be treated fairly, with no disproportionate allocation if all require the same amount. Switches initialized their prices to 0.10/Mb, the c constant was set to 5 and $\alpha'$ was 90%. It was assumed that there was no propagation delay between the users and their NB. Switches updated their price at an interval equal to 20 times the longest propagation delay of any user connected to it. For example in the network shown in FIG. 6, switch 0 updates its price more rapidly than switch 3.

The resource utilization and the QoS provided to the users in the network are of interest. The number of users and the utilization provides insight into the efficiency of the allocation. To measure the QoS observed there was calculated the percentage Good or Better (GoB) quality of service. The GoB measurement is the average percentage of time a user had a quality score of at least 3. The performance can also be seen be the allocation and QoS score graphs accompanying each experiment. The allocation graphs show the individual usage as well as the total usage at a particular switch. The QoS score graph shows the number of users receiving; excellent QoS (a score of 4.95 or greater), a good QoS (a score between 4.94 and 3) or poor QoS (a score less than 3), over time.

Comparing this pricing technique to a traditional CAC method also is of interest. The CAC method is briefly described in the next section.

This technique requires signaling to allocate resources. Once a user wishes to (re)negotiate for more resources they must send a request to the switches in the route. Each switch reads the request and determines the amount of bandwidth it can allocate. Allocation is performed on a first come first served basis. If the switch is unable to allocate the requested amount, it changes the request to its available amount. The new request is then forwarded to the next switch, where the process is repeated. The last switch then forwards the request back to the user. The result is an allocation which is the minimum amount available in the route. Once the message has reached the NB, it must decide if the allocated amount is sufficient using the QoS profile given in FIG. 5. If so, it will start sending at the allocated value. Note this allocation process requires at least a round trip propagation delay before a higher rate can be sent. If the user wishes to use less resources, it can do so immediately but must also notify the switches in the route. This is a reactive strategy, since the user does not scale back until the network cannot support their demands.

CBR experiments allow better understanding of the algorithm performance. It is easy to determine whether the resulting allocations are Pareto optimal and if the price reaches equilibrium. All previous pricing methods have used CBR sources, but few with complex network configurations. For this experiment each source required a bandwidth of 20 Mbps for a duration of 60 seconds. A maximum of seven users can use the switch at their peak rate, however more users should have access because of the QoS profile.

Figure 7A:
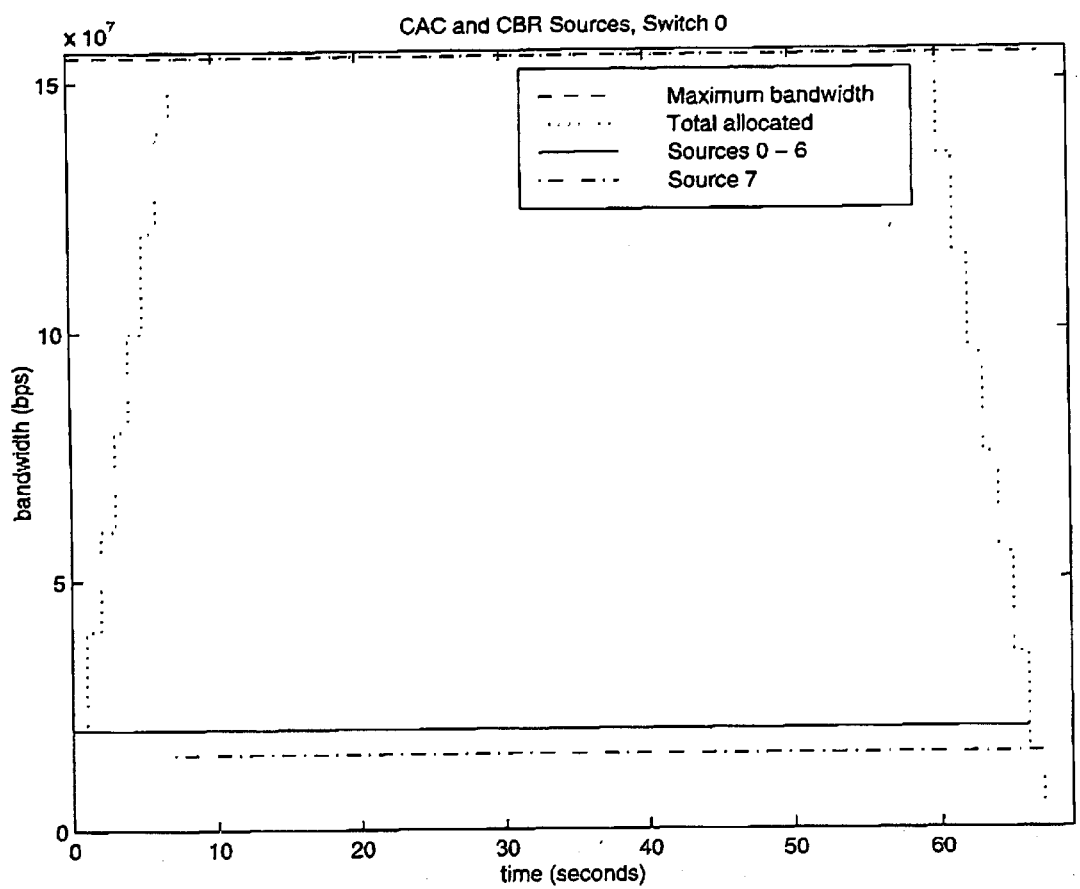
FIG. 7A shows a switch 0 allocation graph for the CAC method and CBR sources.
Figure 7B:
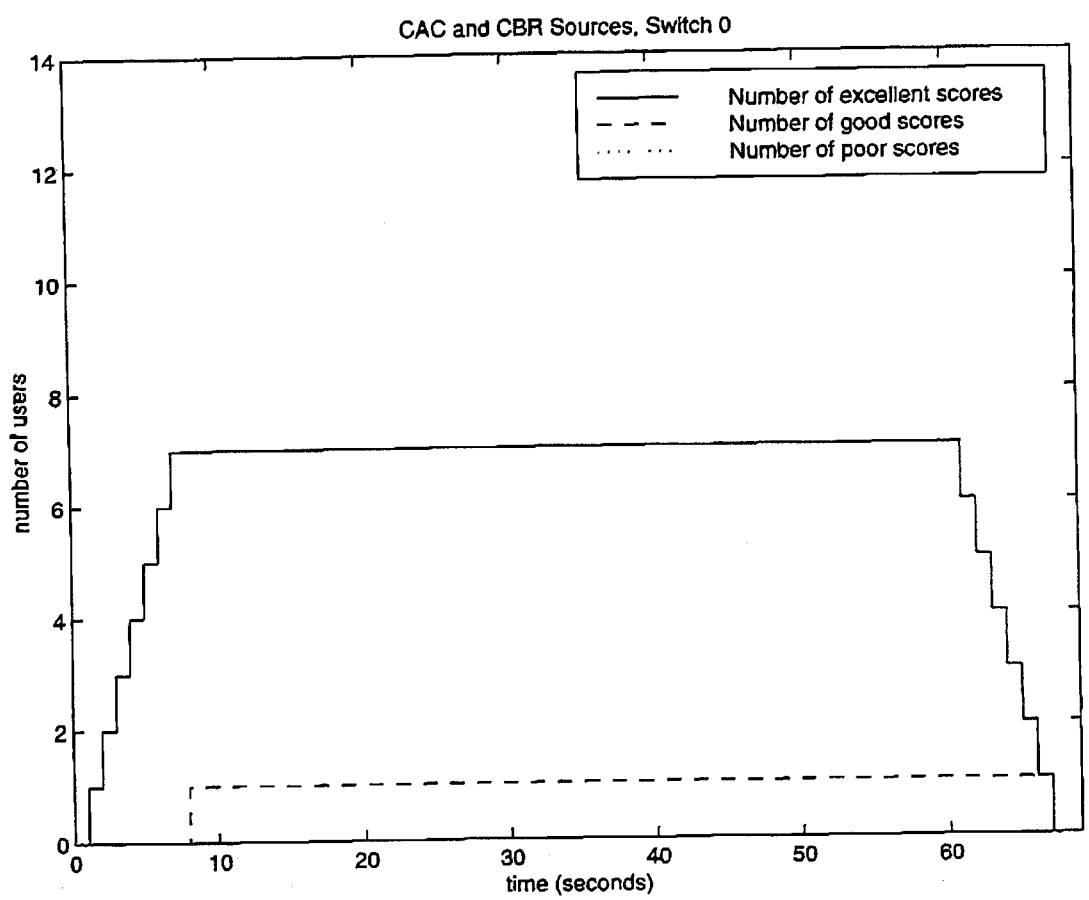
FIG. 7B shows a switch 0 QoS score graph for the CAC method and CBR sources.

The results of the pricing method and the dynamic CAC are given in Table 2. As noted in the table, the CAC method could only support eight users per switch (seven at their peak and one at 15 Mbps). The first eight users arriving at any switch had access, the remaining were denied service. The allocation and QoS scores for switch 0 are given in FIGS. 7A and 7B (7A shows allocation; 7B shows QoS scores) and was representative of the other switches in the network. The allocation is Pareto-optimal, however it is unfair. The switch can support more users if existing users were forced to scale back.

Figure 8A:
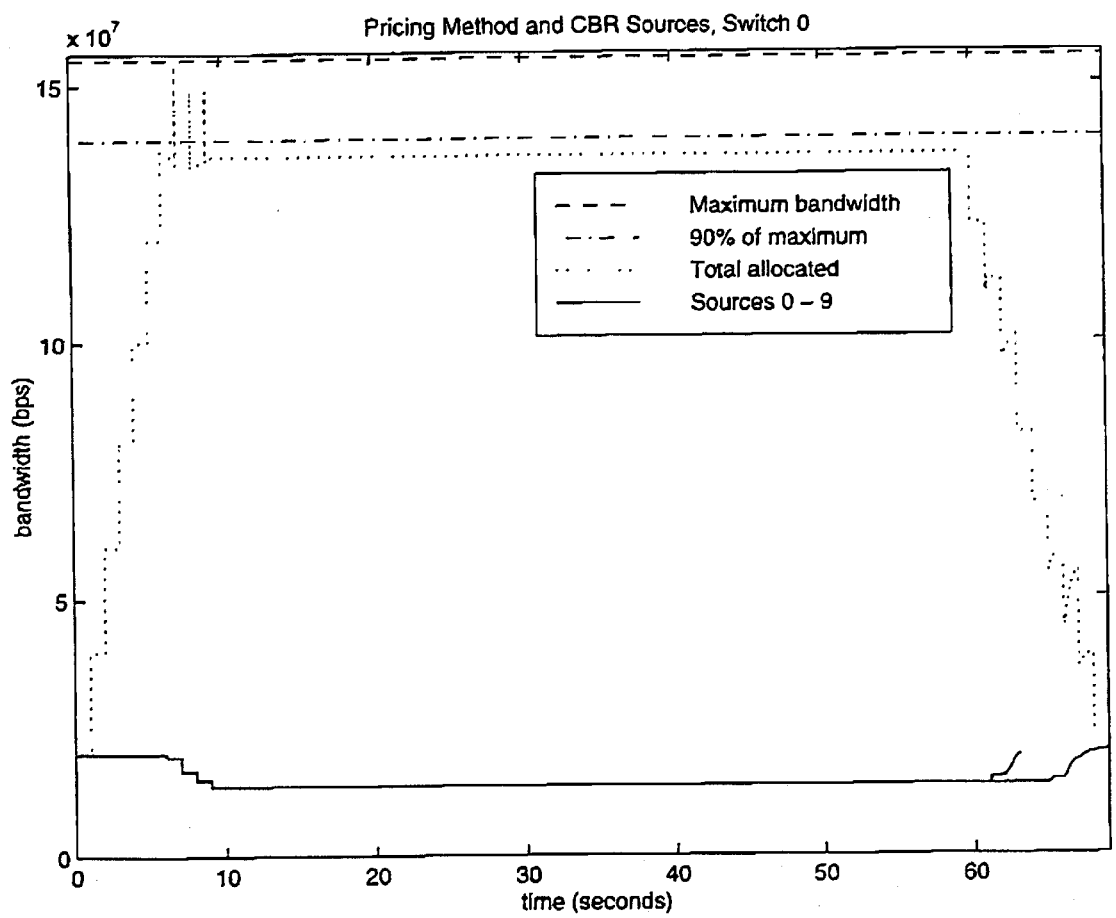
FIG. 8A shows a switch 0 allocation graph for the price method and CBR sources.
Figure 8B:
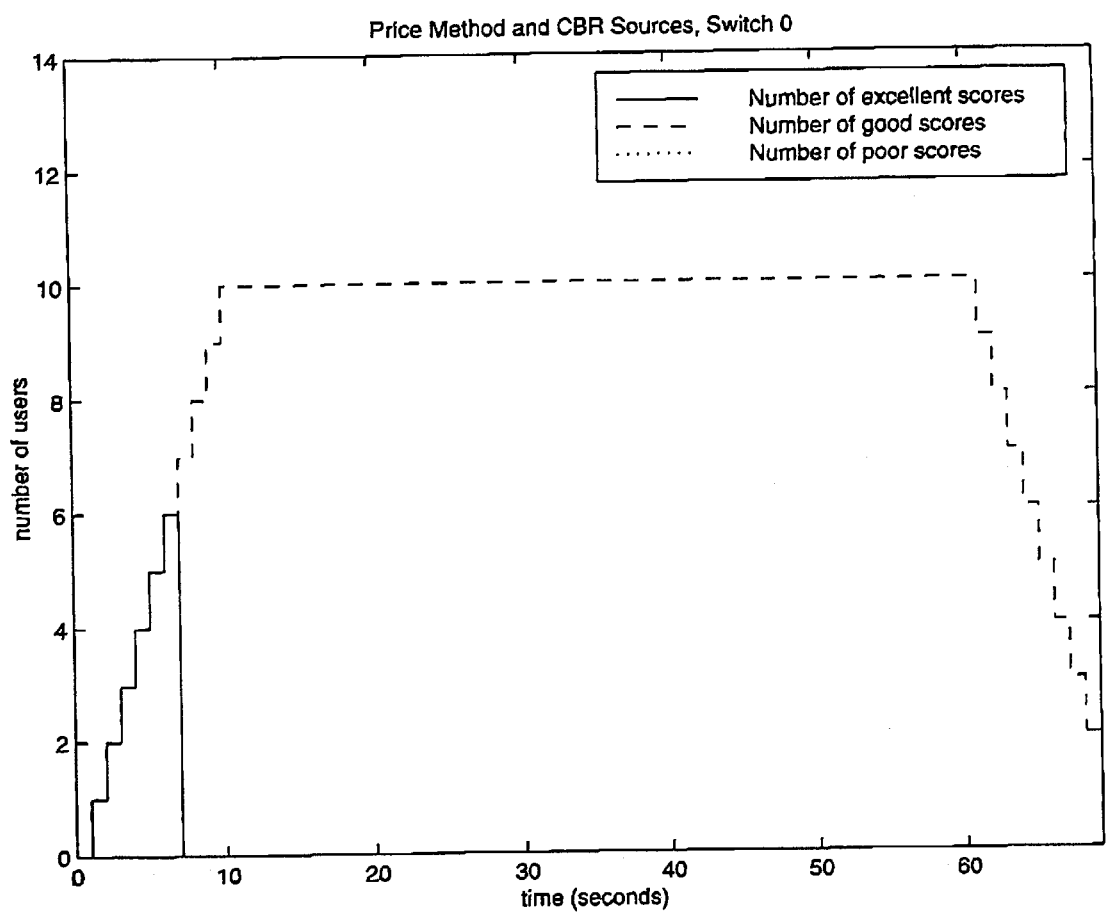
FIG. 8B shows a switch 0 QoS score graph for the price method and CBR sources.

The pricing method supports ten users per switch as noted in Table 2. As users initially entered the network, they used their desired bandwidth (20 Mbps) as seen in FIGS. 8A and 8B. At switch zero, the seventh user entered increasing the price and causing others currently using the switch to scale back. This continued until the ninth user accessed the switch. Then the price reached an equilibrium point and the remaining users (10–12) could not afford to start their session. This provides a fair Pareto-optimal allocation, where each user had approximately the same allocation as well as the same QoS score, as seen in the QoS score graph. This was expected since all users have the same purchasing power. The other switches behaved in a similar fashion. The pricing technique allowed 40 users in the network as compared to 32 from the CAC method, a 25% increase. As users exited the switch, the reduction in price caused others to increase their consumption, as seen in FIGS. 8A and 8B. Therefore the pricing mechanism also attempts to maximize utilization, by lowering the price and encouraging usage.

TABLE 2

CBR Results

| Switch | Peak CAC | | Price method | |
|---|---|---|---|---|
| | Number of sources | Utilization | Number of sources | Utilization |
| 0 | 8 | 90 | 10 | 79 |
| 1 | 8 | 80 | 10 | 70 |
| 2 | 8 | 72 | 10 | 65 |
| 3 | 8 | 69 | 10 | 65 |
| 4 | 8 | 66 | 10 | 64 |
| 5 | 8 | 60 | 10 | 60 |
| 6 | 8 | 59 | 10 | 55 |

All users experienced GoB of 100%

TABLE 3

Statistics about MPEG videos

| Name | Average Rate (Mbps) | Minimum Rate (Mbps) | Peak Rate (Mbps) |
|---|---|---|---|
| Video 1 | 6.78 | 1.49 | 25.3 |
| Video 2 | 5.98 | 1.76 | 17.8 |
| Video 3 | 4.13 | 1.48 | 17.3 |

Frame rate for each video = 30 fps

A description will now be made of the VBR results.

For these experiments each source used one of three MPEG-compressed traces. Statistics about the traces are given in Table 3 and their duration was approximately 20 minutes. For VBR sources a single equilibrium price will not exist. This is due to the changing demands of the sources over time. However, at any point in time there exists such a price and the pricing rule always adjusts the current price towards it.

Figure 9A:
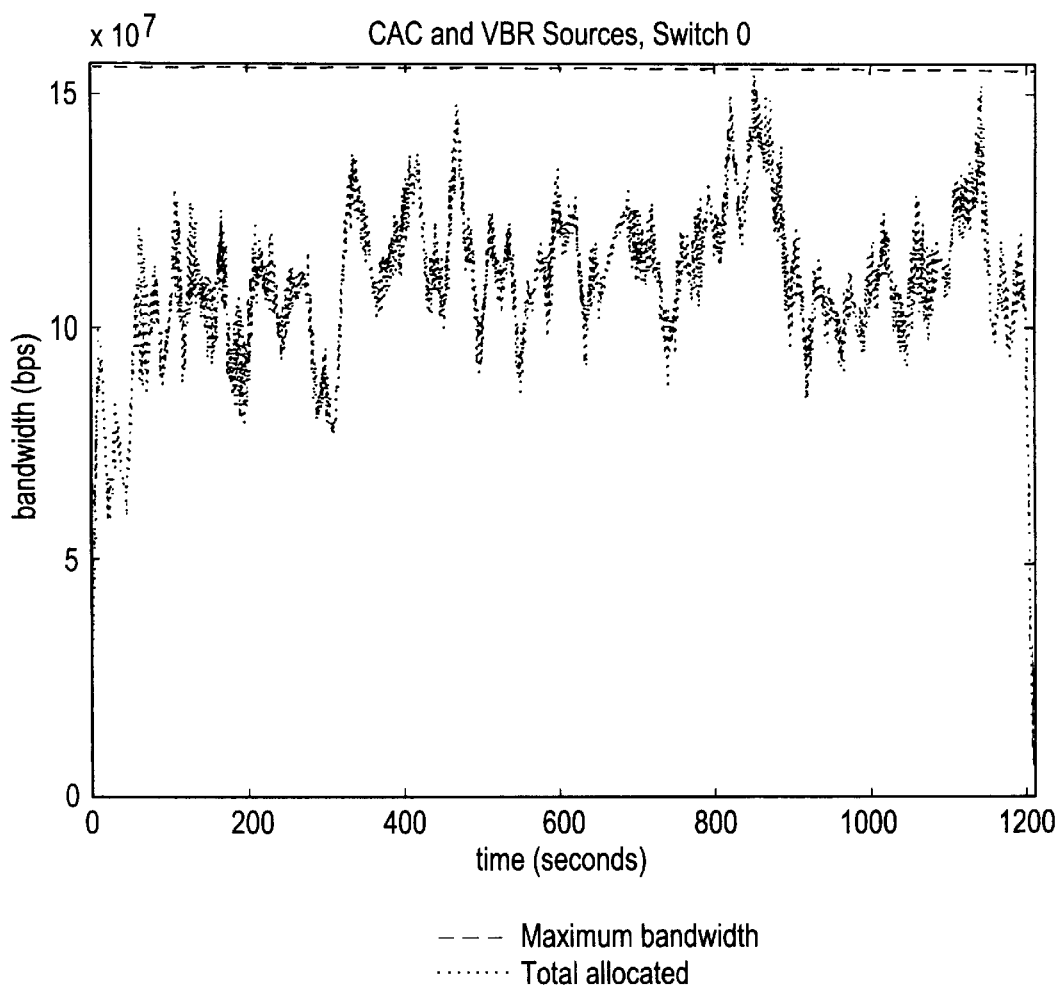
FIG. 9A shows a switch 0 allocation graph for the CAC method and VBR sources.
Figure 9B:
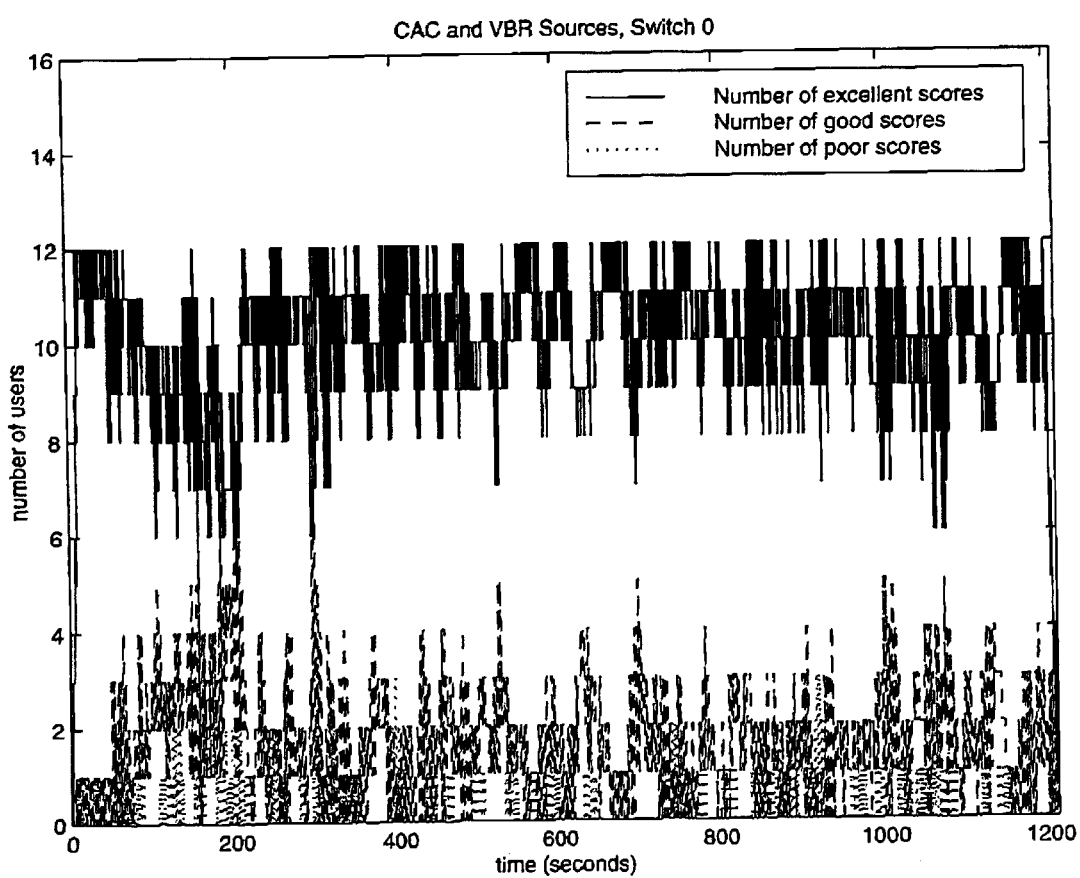
FIG. 9B shows a switch 0 QoS score graph for the CAC method and VBR sources.

The results of the pricing method and the traditional CAC are given in Table 4 and may be understood with reference to FIG. 9A (allocation graph for CAC with VBR sources), FIG. 9B (QoS scores graph for CAC with VBR sources). These two figures should be compared with FIGS. 10A and 10B (allocation and QoS scores, respectively, for pricing method with VBR sources). As seen in the table, the CAC and price method resulted in very similar utilization and GoB percentages. The difference in performance can be noted in the aforementioned FIGS. 9A, 9B, 10A, and 10B. The QoS values provided by the CAC method ranged from 2.2 to 5. This was the result of signaling delay. Consider a point where a user needs more bandwidth. They must wait twice the propagation delay before sending at the new rate (if it was available). During this delay the user can only send at the rate currently allocated, resulting in a very low QoS score (2.2 in some cases). This was especially true for sources with longer routes. The result is a higher variation in the observed QoS of a user.

TABLE 4

VBR Results

| Switch | Peak CAC | | | Price method | | |
|---|---|---|---|---|---|---|
| | Number of sources | Utilization | % GoB | Number of sources | Utilization | % GoB |
| 0 | 12 | 70 | 99.97 | 12 | 70 | 99.96 |
| 1 | 12 | 73 | 99.98 | 12 | 73 | 99.89 |
| 2 | 12 | 67 | 99.98 | 12 | 67 | 99.99 |
| 3 | 12 | 72 | 99.94 | 12 | 72 | 99.87 |
| 4 | 12 | 69 | 99.99 | 12 | 70 | 99.98 |
| 5 | 12 | 69 | 99.98 | 12 | 70 | 99.99 |
| 6 | 12 | 65 | 99.99 | 12 | 66 | 100.0 |

Figure 10A:
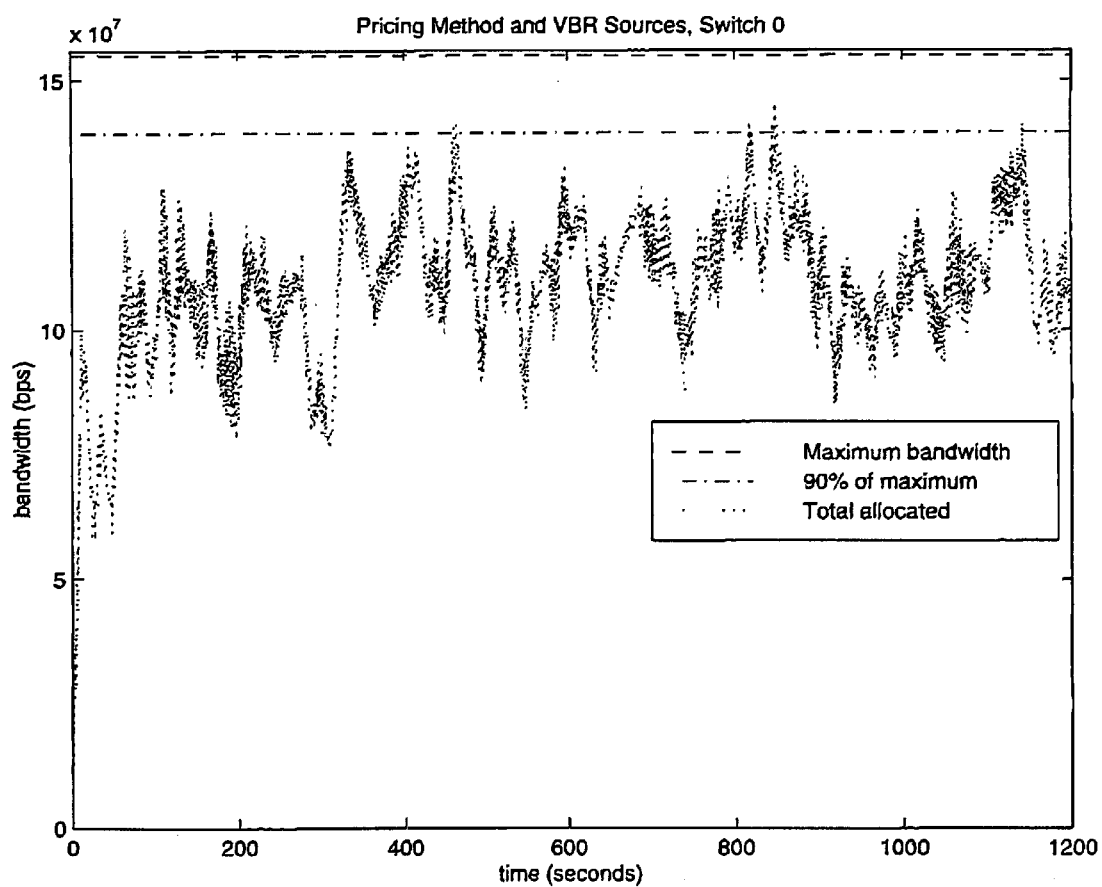
FIG. 10A shows a switch 0 allocation graph for the price method and VBR sources.
Figure 10B:
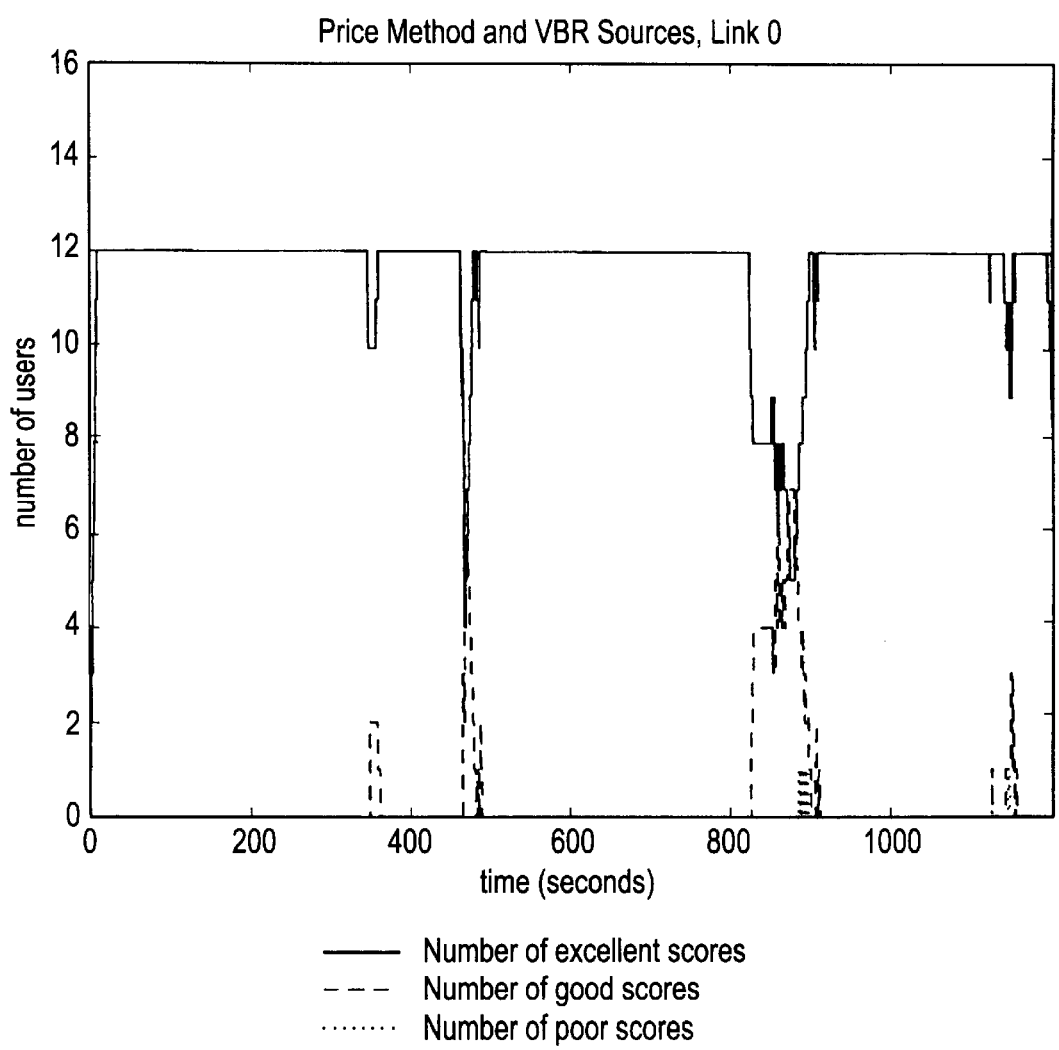
FIG. 10B shows a switch 0 QoS score graph for the price method and VBR sources.

The pricing technique does not suffer from signaling delays since users immediately send at the new rate (if they can afford it), as seen in FIGS. 10A and 10B. The number of excellent scores drops only when the total allocation reaches the 90% level (recall that α was set to 90%). At this point the price increases and the users must scale their usage.

The QoS observed from the CAC technique shows a strong advantage for pricing. Pricing avoids QoS fluctuations by eliminating signaling and the delays associated with it. Users proactively scaled their usage based on the prices and their budgets.

A description will now be given concerning the results with respect to interactive VBR.

For this experiment a single switch and interactive videos were simulated. The switch had a capacity of 155 Mbps and users were connected with 25 km links. Each source was one of the three PEG-compressed videos described in Table 3. The interactivity modeled included altering the frame rate and/or the resolution of the video. The frame rate could be either 30, 20 or 10 fps. The resolution was either 480×640 or 240×320. Both the frame rate and resolution changed uniformly for the duration of the video. Sources started their sessions in one second intervals.

Figure 11A:
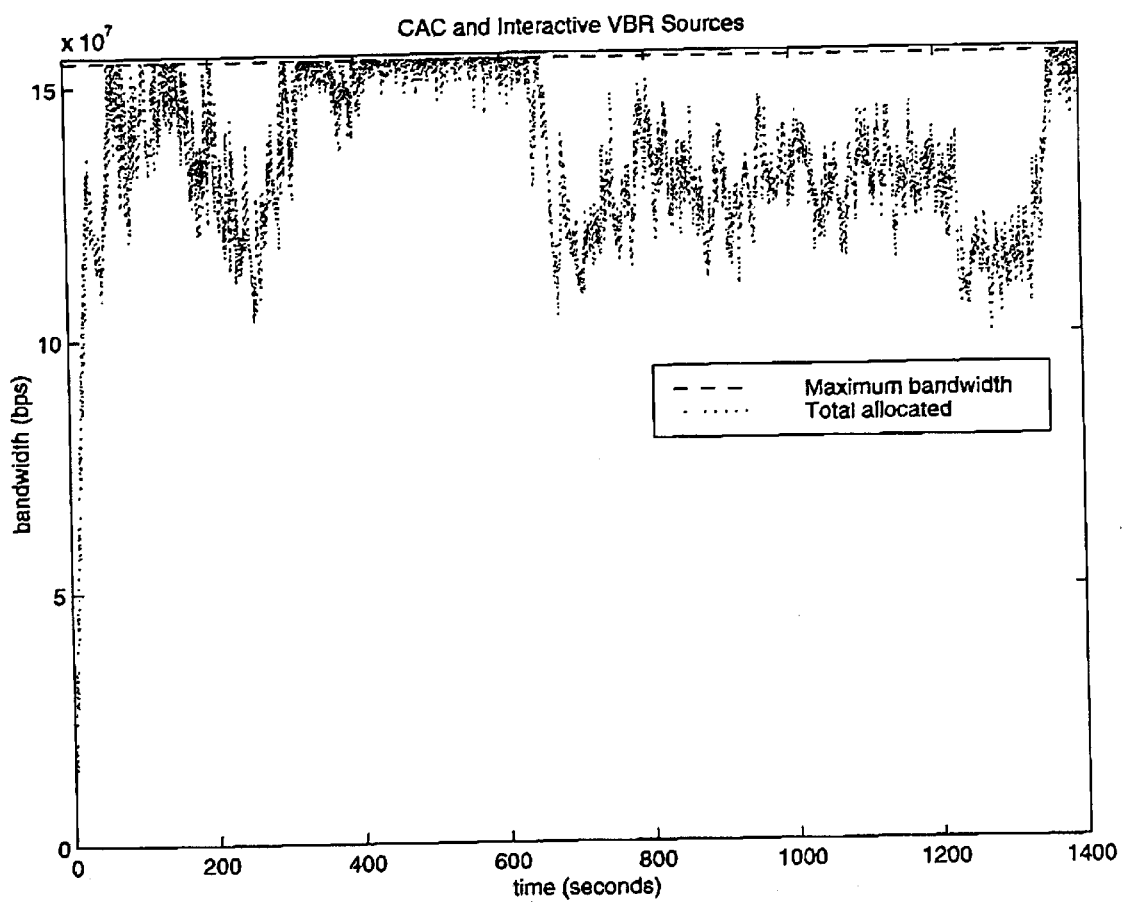
FIG. 11A shows an allocation graph for the CAC method with 32 interactive VBR sources.
Figure 11B:
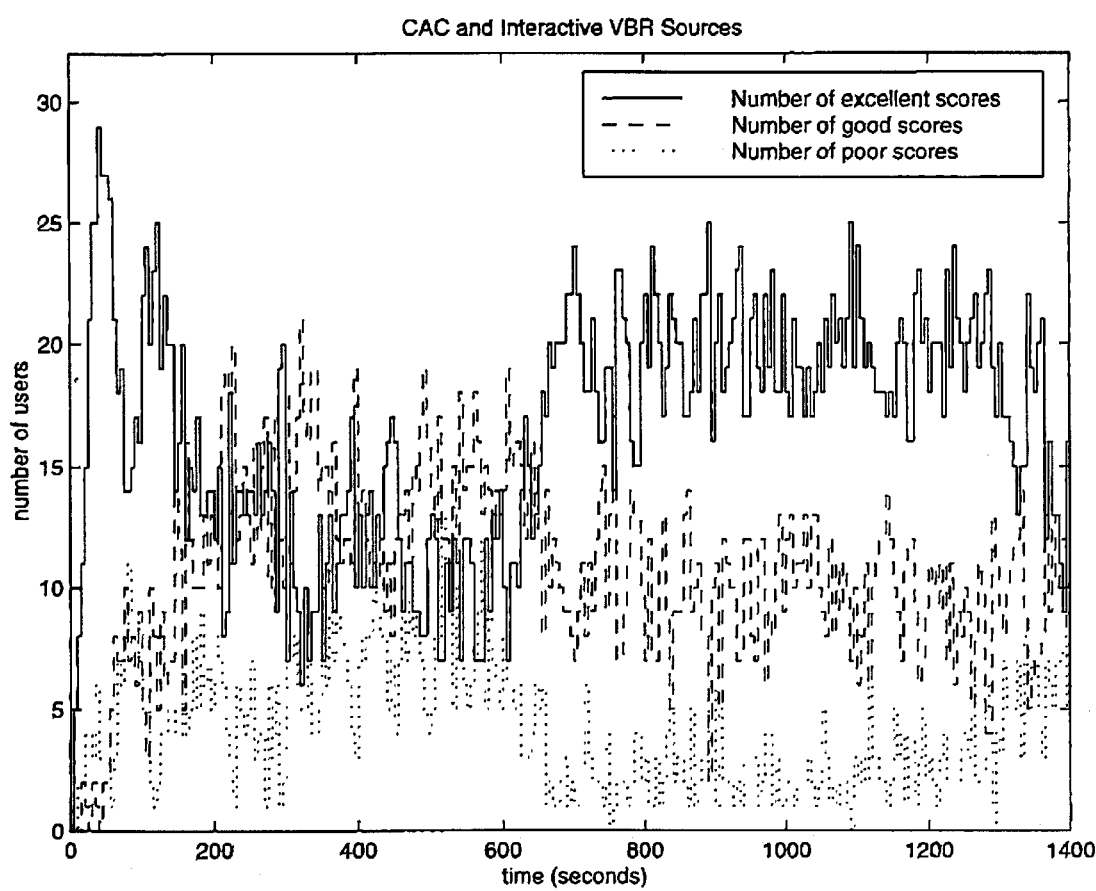
FIG. 11B shows a QoS score graph for the CAC method with 32 interactive VBR sources.
Figure 12A:
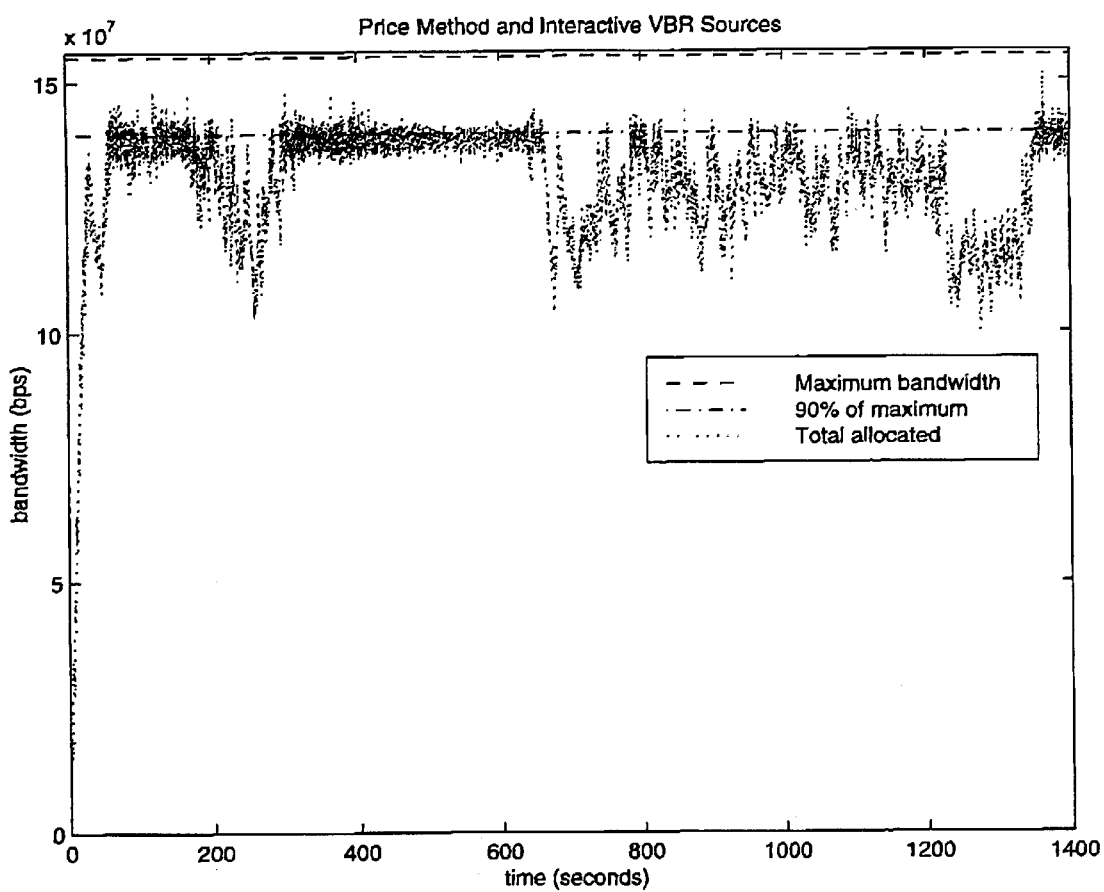
FIG. 12A shows an allocation graph for the price method with 32 interactive VBR sources.
Figure 12B:
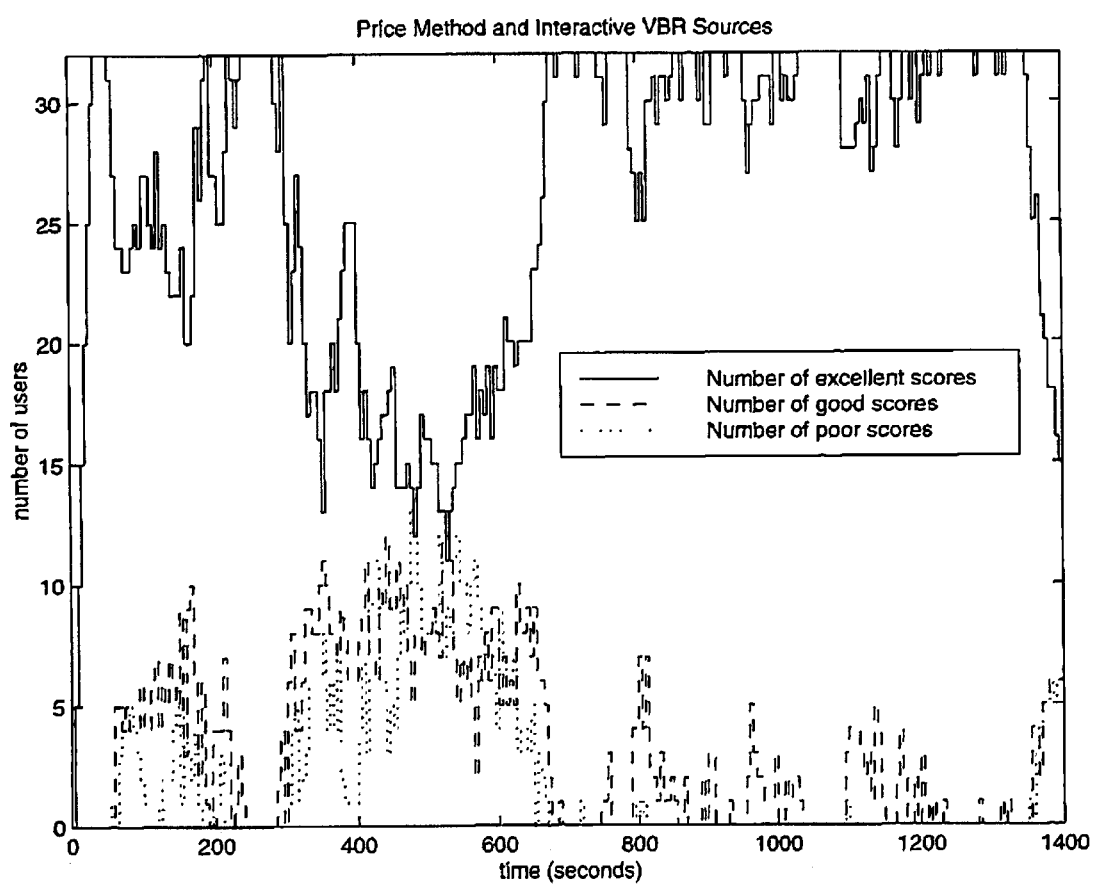
FIG. 12B shows a QoS score graph for the price method with 32 interactive VBR sources.

Results for the interactive videos are presented in Table 5 and with reference to FIGS. 11A (allocation graph for CAC with 32 interactive VBR sources), 11B (QoS scores graph, CAC with 32 interactive VBR sources), 12A (allocation graph for pricing method with 32 interactive VBR sources) and 12B (QoS scores graph, pricing method with 32 interactive VBR sources). As described the in the table, both methods were able to support 32 sources. Again the CAC method suffered from signaling delays as seen in the QoS score graph. The CAC method rarely had all 32 users experiencing an excellent QoS score. The price method was able to achieve a higher number of excellent scores, as seen in the QoS score graph (FIG. 12B). The utilization of the switch was slightly lower for the price method. When the total allocated bandwidth reached 90% of the maximum, the price increased causing users to scale back. If the total amount allocated was below 90% the maximum, the price lowered and users were able to allocated their desired bandwidth.

TABLE 5

Interactive VBR Results

| Peak CAC | | | Price Method | | |
| --- | --- | --- | --- | --- | --- |
| Number of sources | Utilization | % GoB | Number of sources | Utilization | % GoB |
| 32 | 87 | 97.35 | 32 | 84 | 96.50 |

The invention involves a decentralized flow control method based on microeconomics. A computer network was viewed as an economy consisting of three entities; users, Network Brokers (NB) and switches. In this system users are charged for their use of network resources. The network broker, working as an agent for the user, collects prices and determines usage levels that maximize the user's utilization. Once a new amount is determined, it is immediately used (no signaling is required). Switches contain the resources sought after and are priced to reflect local supply and demand. As demand increases, so does the price and vice versa. An equilibrium price is reached when the demand equals the supply. This encourages high utilization of the resources. These prices then are periodically forwarded to the NB using them.

The pricing reaches a Walrasian equilibrium. At this point the supply equals the demand and the price is stable. When there is a shift in the demand that exceeds a predetermined threshold (10% change in the preferred embodiment), the price is adjusted to move back to equilibrium. Fair Pareto-optimal usage is provided. This results in users using only their fair share, as related to their budgets. The technique also is decentralized and is scalable to a variety of networks.

The experimental results verify that high resource utilization is achieved even with an increased number of users. Compared to the traditional CAC method, the network flow control in accordance with the invention provides fairer distributions without the overhead of signaling and without latency.

The pricing policy according to the preferred embodiment encourages high bandwidth utilization. It was shown that this strategy provides fair resource distribution and high QoS scores.

It will be appreciated that the above-identified invention in all of its embodiments may be embodied in a computer network operating according to a particular flow control method, in a node of a computer network which operates according to the method, in a computer program product for enabling a computer network or a node of a computer network to operate according to the method, and in a method per se of flow control for a computer network.

On a practical level, the software that enables the computer system to perform the above-identified network flow control method of the invention is supplied on any one of a variety of media. Furthermore, the actual implementation of the method of the invention is actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to supply software for enabling a computer system to operate in accordance with the invention as a node, network broker, switch, or user, the supplier might provide a diskette or might transmit the software in some form via satellite transmission, via a direct telephone link, or via the Internet.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form software to enable a computer system to operate according to the above-identified invention.

Thus, the invention is also embodied in a program product bearing software which enables a computer to perform operations according to the invention.

The invention is intended to be construed not only with respect to the examples described above, but with respect to any and all equivalents in accordance with the appended claims.

There is claimed:

1. A method of flow control for a network of switches connecting users, comprising:

providing a plurality of network brokers, each network broker corresponding to a respective one of a plurality of users, including a first network broker corresponding to a first user and a second network broker corresponding to a second user;

providing a quality of service profile for said first user to said first network broker;

providing route information relating to a route from said first to said second user, said route including one of said switches defining a first switch;

providing from said first user to said first network broker a present desired bandwidth value;

sending respective current price quote information from said first switch to said first network broker;

selecting, by said first network broker, of a resource utilization rate to define a selected resource utilization rate, wherein said selected resource utilization rate is selected based on:
- a respective resource budget of said first user,
- said quality of service profile of said first user,
- said present desired bandwidth value for said first user, and
- said current price quote information of said first switch; and transmitting from said first user to said second user at said selected resource utilization rate.

2. The method of flow control as set forth in claim 1, wherein said first switch further sends updated price quote information at a timing based on changes in demand in said first switch.

3. The method of flow control as set forth in claim 2, wherein said updated price quote is defined by:

$$p_{n+1}^i = p_n^i + c \cdot \left( \frac{bw_{recv}^i - \alpha \cdot BW_{total}^i}{\alpha \cdot BW_{total}^i} \right)$$

where:
- $p_{n+1}^i$ is the updated price quote;
- $p_n^i$ is the current price for bandwidth at said switch;
- $BW_{total}^i$ is the bandwidth capacity of said switch;
- $bw_{recv}^i$ is the total traffic entering said switch; and
- c and $\alpha$ are constants.

4. The method of flow control as set forth in claim 1, wherein:
- said step of providing route information further comprises said route from said first to said second user being predetermined;
- said route further includes another one of said switches defining a second switch; and
- said selecting of said resource utilization rate by said first network broker is based also on respective current price quote information of said second switch.

5. The method of flow control as set forth in claim 4, wherein said step of sending respective current price quote information further comprises said second switch separately sending said respective current price quote information thereof to said first network broker.

6. The method of flow control as set forth in claim 4, wherein said step of sending respective current price quote information further comprises:
- sending, from said second switch, respective current price quote information thereof to said first switch; and
- said first switch including said respective current price quote information sent by said second switch in said respective price quote information price of said first switch sent to said first network broker.

7. The method of flow control as set forth in claim 1, further comprising:
- said step of providing route information further comprising information relating to another route from said first to said second user, said another route including another one of said switches defining a second switch, said route that includes said first switch and said route that includes said second switch define a plurality of possible routes;
- said selecting of said resource utilization rate by said first network broker being based also on respective current price quote information of said second switch; and
- said first network broker selecting one of said plurality of possible routes based on a comparison of said current price quote information of said switches along said plurality of possible routes.

8. The method of flow control as set forth in claim 1, wherein said step of selecting said resource utilization rate further comprises:
- making a pricing prediction, at said first network broker, of how said current price quote information will change in response to said first user transmitting to said second user; and
- selecting said selected resource utilization rate based also on said pricing prediction.

9. A computer network, comprising:
- switches, and users interfaced to said switches by respective network brokers corresponding to said users, including a first network broker corresponding to a first user and a second network broker corresponding to a second user;
- said first network broker having, for said first user, a quality of service profile, a present desired bandwidth value, a resource budget, and route information relating to said switches including a route from said first to said second user, said route including one of said switches defining a first switch;
- said first switch sending respective current price quote information to said first network broker;
- said first network broker selecting a selected resource utilization rate based on:
  - said respective resource budget of said first user,
  - said quality of service profile of said first user,
  - said present desired bandwidth value for said first user, and
  - said current price quote information of said first switch; and
- said first user transmitting to said second user at said selected resource utilization rate.

10. The computer network as set forth in claim 9, wherein said first switch farther sends updated price quote information at a timing based on changes in demand in said first switch.

11. The computer network as set forth in claim 10, wherein said updated price quote is defined by:

$$p_{n+1}^i = p_n^i + c \cdot \left( \frac{bw_{recv}^i - \alpha \cdot BW_{total}^i}{\alpha \cdot BW_{total}^i} \right)$$

where:
- $p_{n+1}^i$ is the updated price quote;
- $p_n^i$ is the current price for bandwidth at said switch;
- $BW_{total}^i$ is the bandwidth capacity of the switch;
- $bw_{recv}^i$ is the total traffic entering the switch; and
- C and $\alpha$ are constants.

12. The computer network as set forth in claim 9, wherein:
- said route information further comprises said route from said first to said second user being predetermined;
- said route further includes another one of said switches defining a second switch; and said selected resource utilization rate is based also on respective current price quote information of said second switch.

13. The computer network according to claim 12, wherein said second switch separately sends said respective current price quote information thereof to said first network broker.

14. The computer network according to claim 12, further comprising:
said second switch sending respective current price quote information thereof to said first switch; and
said respective price quote information of said first switch including said respective current price quote information sent by said second switch to said first switch.

15. The computer network as set forth in claim 9, further comprising:
said route information relating to said switches further comprising information relating to another route from said first to said second user, said another route including another one of said switches defining a second switch, said route that includes said first switch and said route that includes said second switch defining a plurality of possible routes; and
said first network broker selecting said selected resource utilization rate based also on respective current price quote information of said second switch; and
said first network broker selecting one of said plurality of possible routes based on comparing said current price quote information of said switches along said plurality of possible routes.

16. The computer network as set forth in claim 9, wherein:
said first network broker makes a pricing prediction of how said current price quote information will change in response to said first user transmitting to said second user; and
said first network broker selects said selected resource utilization rate based also on said pricing prediction.

17. A switching node of a computer network, comprising:
a network interface, a control system, and means for monitoring bandwidth;
said control system sending, via said network interface, current price quote information to network brokers on said computer network; and
said current price quote information being updated by said control system to provide an updated price quote at a timing based on switch demand as determined by said means for monitoring bandwidth.

18. The switching node as set forth in claim 17, wherein said updated price quote is defined by:

$$p_{n+1}^i = p_n^i + c \cdot \left( \frac{bw_{recv}^i - \alpha \cdot BW_{total}^i}{\alpha \cdot BW_{total}^i} \right)$$

where:
$p_{n+1}^i$ is the updated price quote;
$p_n^i$ is the current price for bandwidth at said switch;
$BW_{total}^i$ is the bandwidth capacity of the switch;
$bw_{recv}^i$ is the total traffic entering the switch; and
c and $\alpha$ are constants.

19. A computer program product, comprising:
computer readable instructions, and
a computer readable medium bearing said computer readable instructions;
said instructions being adapted to enable a computer to operate, in a network of switches connecting users, including a first and a second user, according to the steps of:
accessing a quality of service profile for said first user;
accessing route information relating to a route from said first to said second user, said route including one of said switches defining a first switch;
receiving from said first user an indication of a present desired bandwidth value;
receiving current price quote information from said first switch;
selecting a resource utilization rate to define a selected resource utilization rate based on a respective resource budget of said first user, said quality of service profile of said first user, said present desired bandwidth value for said first user, and said current price quote information of said first switch; and
indicating to said first user to transmit to said second user at said selected resource utilization rate.

20. The computer program product as set forth in claim 19, wherein said instructions enable said computer to process updated price quote information from said first switch.

21. The computer program product as set forth in claim 19, wherein said instructions enable said computer to operate according to the further steps of:
receiving, from a second switch on said route between said first and said second user, a respective current price quote sent from said second switch; and
basing said selection of said selected resource utilization rate further on said respective current price quote sent from said second switch.

22. The computer program product as set forth in claim 19, wherein said instructions enable said computer to operate according to the further step of selecting, from a plurality of possible routes between said first user and said second user, a route based on said respective current price quote information from each switch along each of said plurality of possible routes.

23. The computer program product as set forth in claim 19, wherein said instructions enable said computer to operate according to the further steps of:
making a pricing prediction of how said current price quote information will change in response to said first user transmitting to said second user; and
selecting said selected resource utilization rate based also on said pricing prediction.

* * * * *